(12) United States Patent
Nothum, Jr. et al.

(10) Patent No.: US 11,278,033 B2
(45) Date of Patent: Mar. 22, 2022

(54) FOOD PRODUCT LOADER FOR FOOD PROCESS LINES

(71) Applicants: Robert G. Nothum, Jr., Willard, MO (US); Ryan D. Nothum, Springfield, MO (US)

(72) Inventors: Robert G. Nothum, Jr., Willard, MO (US); Ryan D. Nothum, Springfield, MO (US)

(*) Notice: Subject to any disclaimer, the term of this patent is extended or adjusted under 35 U.S.C. 154(b) by 0 days.

(21) Appl. No.: 17/021,587

(22) Filed: Sep. 15, 2020

(65) Prior Publication Data

US 2021/0100258 A1    Apr. 8, 2021

Related U.S. Application Data

(63) Continuation-in-part of application No. 16/658,460, filed on Oct. 21, 2019, now abandoned, which is a
(Continued)

(51) Int. Cl.
| | |
|---|---|
| *A22C 25/08* | (2006.01) |
| *B65G 47/12* | (2006.01) |
| *A22C 21/00* | (2006.01) |
| *B65G 47/88* | (2006.01) |
| *B65G 47/71* | (2006.01) |
| *A22C 17/00* | (2006.01) |

(52) U.S. Cl.
CPC .......... *A22C 21/0053* (2013.01); *B65G 47/12* (2013.01); *B65G 47/715* (2013.01); *B65G 47/8876* (2013.01); *A22C 17/0093* (2013.01); *B65G 2201/0202* (2013.01); *B65G 2201/047* (2013.01)

(58) Field of Classification Search
CPC .... A22C 21/0053; A22C 25/08; B65G 47/12; B65G 47/715; B65G 47/8876
USPC ............................ 193/34; 452/177, 181, 183
See application file for complete search history.

(56) References Cited

U.S. PATENT DOCUMENTS

| | | | |
|---|---|---|---|
| 3,340,790 A | 9/1967 | Simjian ..................... | A47F 1/00 |
| 3,465,383 A | 9/1969 | Willis et al. ......... | A22C 29/023 |
| | (Continued) | | |

FOREIGN PATENT DOCUMENTS

| | | | | |
|---|---|---|---|---|
| DE | 10 2004 062 137 | | 2/2006 | ............... A23G 3/20 |
| DE | 20 2009 016 645 | | 5/2011 | ............. B65G 47/08 |
| | (Continued) | | | |

OTHER PUBLICATIONS

PCT/US2017/033355, John Shell, Nov. 23, 2017.*
NL Search Report, Appln. No. NL 2020691 dated Jan. 15, 2019.

*Primary Examiner* — Douglas A Hess
(74) *Attorney, Agent, or Firm* — Jonathan A. Bay

(57) ABSTRACT

A food-product loader has a conveyor passing through its cabinet, and the cabinet is formed with a bulk hopper. The loader is loaded with elongate pieces of food-product by way of dumping a heaping mass of the food-product pieces into the bulk hopper all at one time. The loader ultimately handles the heap of food-product pieces such that, the loader loads the pieces onto the conveyor in neat lanes, with individual pieces slightly spaced apart from one another. To do this, the loader is constructed with a series or array of soft-sided dispensing sleeves or funnels which are mechanically massaged to tease out one piece at a time, and only one piece at a time.

18 Claims, 20 Drawing Sheets

Related U.S. Application Data continuation-in-part of application No. 15/940,003, filed on Mar. 29, 2018, now Pat. No. 10,889,444.

(60) Provisional application No. 62/749,316, filed on Oct. 23, 2018, provisional application No. 62/478,822, filed on Mar. 30, 2017, provisional application No. 62/545,634, filed on Aug. 15, 2017, provisional application No. 62/560,392, filed on Sep. 19, 2017, provisional application No. 62/577,375, filed on Oct. 26, 2017, provisional application No. 62/648,613, filed on Mar. 27, 2018.

(56) References Cited

U.S. PATENT DOCUMENTS

| | | | |
|---|---|---|---|
| 3,562,856 A | 2/1971 | Eriksen | A22C 25/08 |
| 3,689,958 A | 9/1972 | Dillon | A22C 21/0007 |
| 4,078,517 A | 3/1978 | Castellano et al. | A23P 20/12 |
| 4,132,156 A | 1/1979 | Glaze, Jr. | B31B 50/00 |
| 4,264,634 A | 4/1981 | Hochandel | A23P 20/12 |
| 4,281,757 A | 8/1981 | Morton | B65B 35/246 |
| 4,538,510 A | 9/1985 | Latimer | B65G 17/08 |
| 4,604,704 A | 8/1986 | Eaves | G06Q 10/08 |
| 4,852,475 A | 8/1989 | Yang | A47J 37/1214 |
| 4,966,072 A | 10/1990 | Ellis-Brown | A21B 1/48 |
| 5,060,562 A | 10/1991 | Florindez | A21C 9/081 |
| 5,129,353 A | 7/1992 | Koppens | A21C 9/04 |
| 5,172,636 A | 12/1992 | Theurer | E01B 27/10 |
| 5,330,383 A | 7/1994 | Ryan | A22C 25/08 |
| 5,546,848 A | 8/1996 | Naramura | A21C 9/04 |
| 5,635,235 A | 6/1997 | Sanchez et al. | A21C 1/065 |
| 5,741,536 A | 4/1998 | Mauer | A23B 4/0056 |
| 5,846,046 A | 12/1998 | Warburton | A01D 90/08 |
| 5,847,273 A | 12/1998 | Zubragel | G01F 13/003 |
| 5,881,639 A | 3/1999 | Nesheim | A01J 25/12 |
| 6,006,657 A | 12/1999 | Ikuta | G07F 9/105 |
| 6,495,182 B1 | 12/2002 | Stuck | A21B 3/07 |
| 6,902,089 B2 | 6/2005 | Carnevali | B60R 7/14 |
| 7,174,846 B2 | 2/2007 | Zeegers | A23P 20/12 |
| 7,252,584 B2 | 8/2007 | Kragh | A22C 25/08 |
| 7,637,805 B1 | 12/2009 | Bueide | A22C 25/12 |
| 7,662,034 B2 | 2/2010 | Van Hillo et al. | A22C 21/0023 |
| 7,886,657 B2 | 2/2011 | Nothum, Jr. | A21C 9/04 |
| 7,954,446 B2 | 6/2011 | Nakane | B05B 12/18 |
| 8,517,806 B2 | 8/2013 | Fillenworth et al. | A22C 17/0093 |
| 8,651,015 B2 | 2/2014 | Zhu | A23L 3/32 |
| 8,678,886 B1 * | 3/2014 | Nothum, Jr. | A22C 25/08 452/181 |
| 8,816,223 B2 | 8/2014 | Taylor | A47J 37/12 |
| 10,471,619 B2 * | 11/2019 | Hocker | B26D 5/007 |
| 10,834,947 B2 * | 11/2020 | Rognini | A23L 13/03 |
| 11,019,829 B2 | 6/2021 | Pfannenstiel | A22C 15/00 |
| 2002/0015635 A1 | 2/2002 | Sinn | B65G 41/008 |
| 2003/0008605 A1 | 1/2003 | Hartford | A22C 18/00 |
| 2003/0079678 A1 | 5/2003 | Zeegers | B05C 19/04 |
| 2004/0123566 A1 | 7/2004 | Limousin | B65B 53/063 |
| 2006/0292271 A1 | 12/2006 | King | A23G 3/2076 |
| 2009/0223411 A1 | 9/2009 | Higgins | D06M 13/51 |
| 2009/0294246 A1 | 12/2009 | Pogue | B65G 17/28 |
| 2011/0311685 A1 | 12/2011 | Hogan et al. | A23C 19/00 |
| 2012/0070553 A1 | 3/2012 | Hockett et al. | A47J 37/12 |
| 2015/0053097 A1 | 2/2015 | Vardakostas | A23P 20/20 |
| 2015/0239591 A1 | 8/2015 | Bialy | B65G 37/00 |
| 2016/0088859 A1 | 3/2016 | Ream | A23G 4/18 |
| 2016/0167888 A1 | 6/2016 | Messina | B65G 41/00 |
| 2018/0186576 A1 | 7/2018 | Torrenga | B65G 21/06 |
| 2020/0205461 A1 | 7/2020 | Cohen | A23P 20/12 |

FOREIGN PATENT DOCUMENTS

| | | | |
|---|---|---|---|
| EP | 1 127 496 | 2/2000 | A23L 1/31 |
| EP | 2 481 295 | 8/2012 | A23L 1/31 |

* cited by examiner

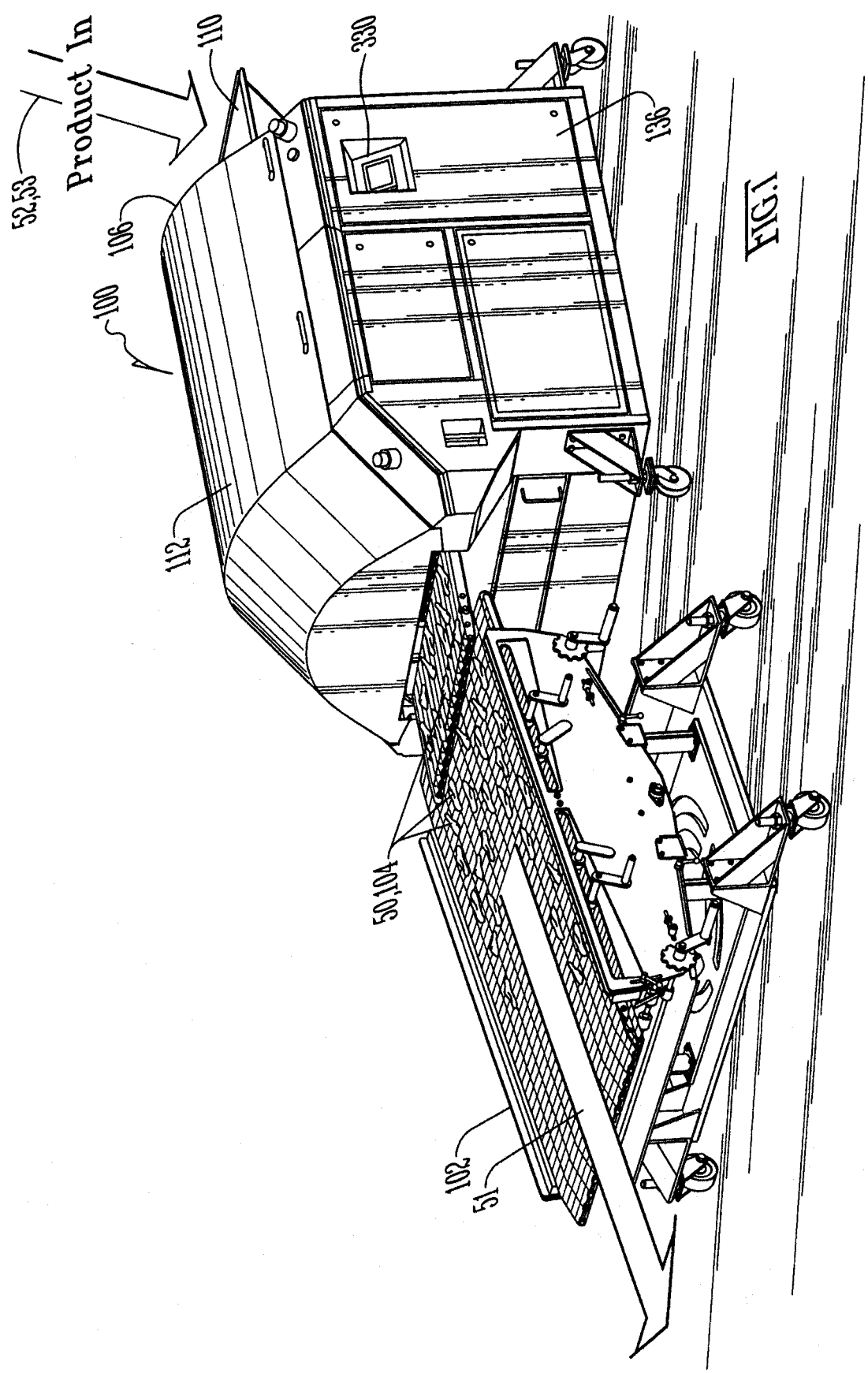

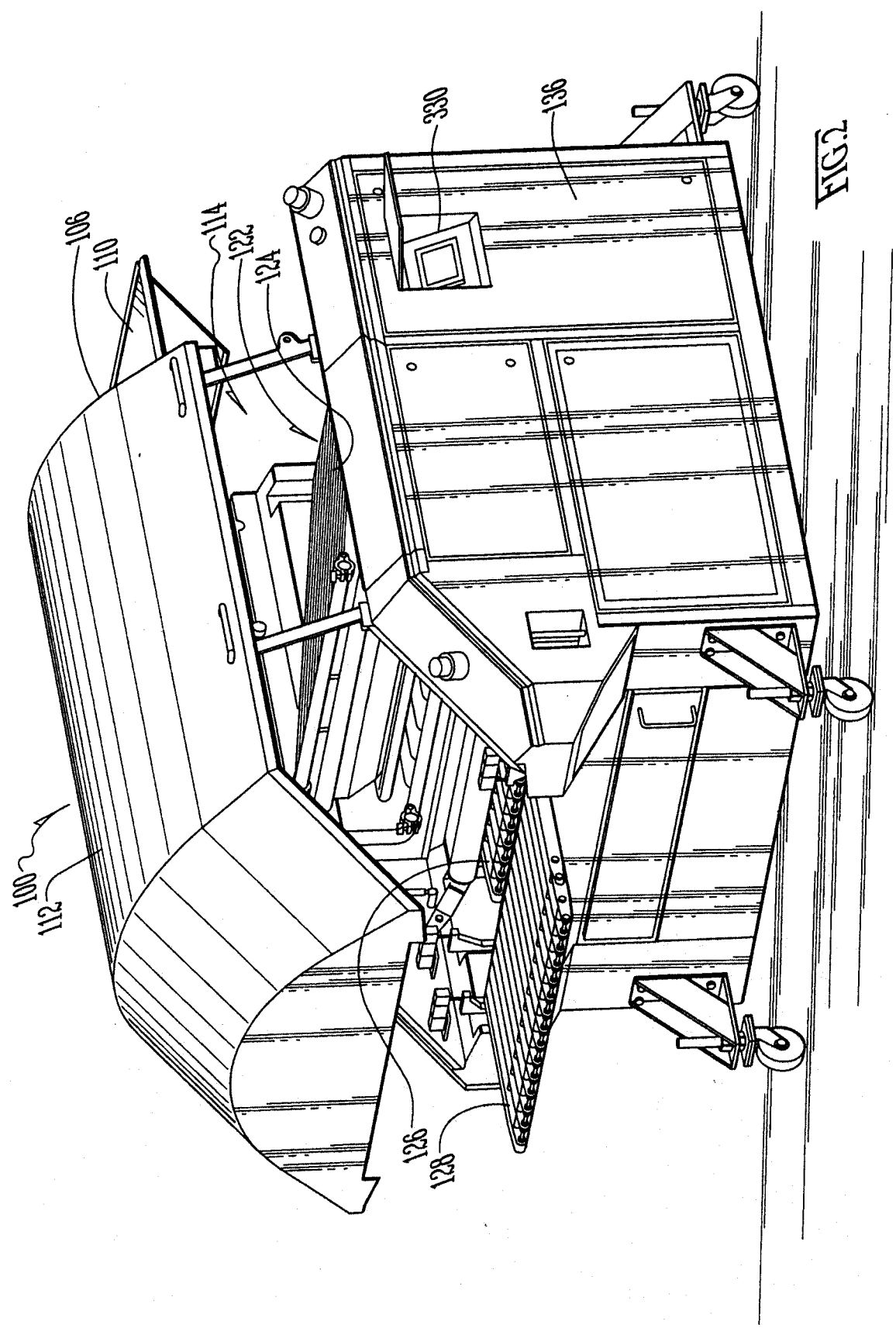

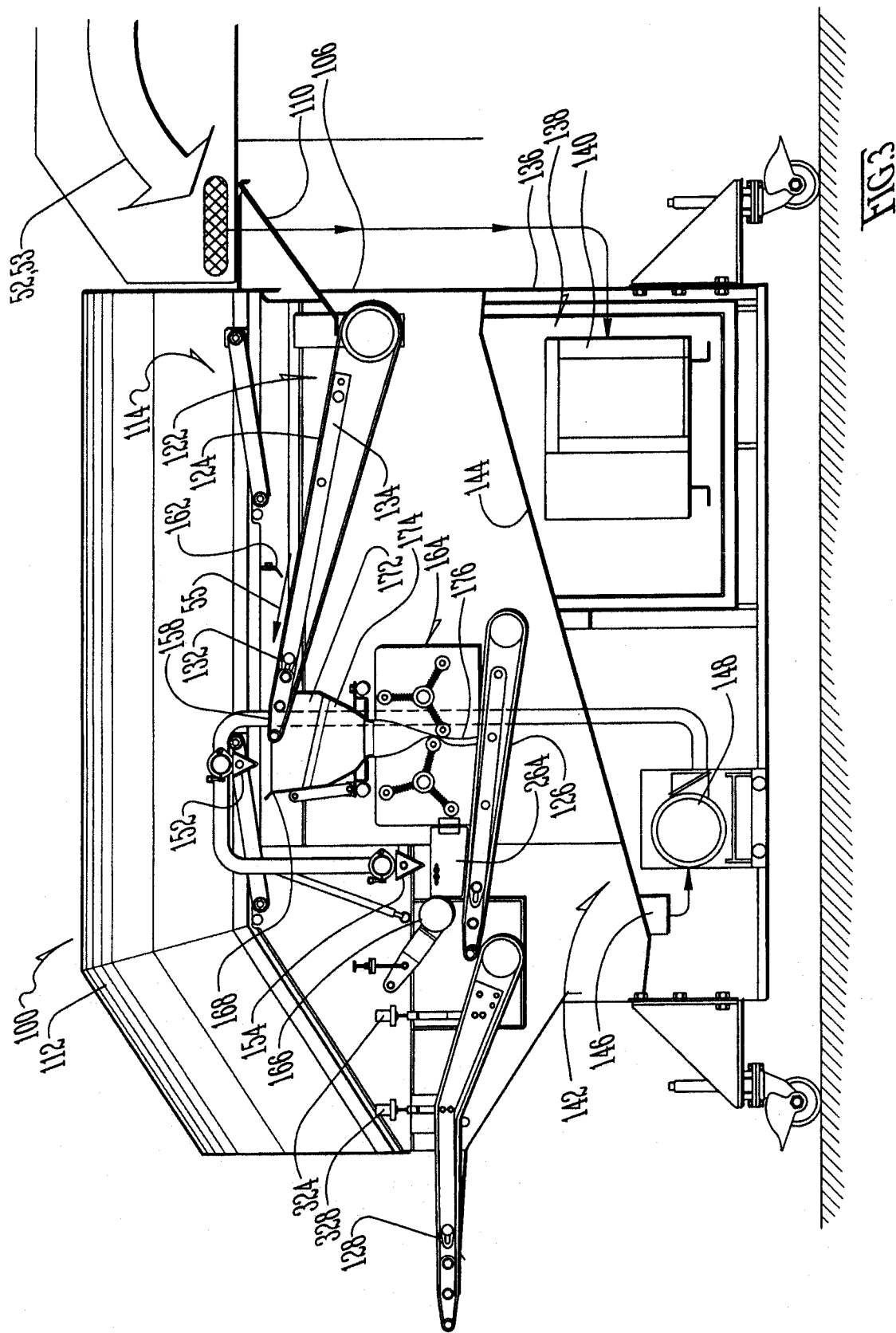

FIG. 13

FOOD PRODUCT LOADER FOR FOOD PROCESS LINES

CROSS-REFERENCE TO PROVISIONAL APPLICATION(S)

This application is a continuation-in-part of U.S. patent application Ser. No. 16/658,460, filed Oct. 21, 2019, which claims the benefit of U.S. Provisional Application No. 62/749,316, filed Oct. 23, 2018.

This application is also a continuation-in-part of U.S. patent application Ser. No. 15/940,003, filed Mar. 29, 2018; which claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018.

The foregoing patent disclosure(s) is(are) incorporated herein by this reference thereto.

BACKGROUND AND SUMMARY OF THE INVENTION

The invention generally relates to automatic food process lines and, more particularly, to a food product loader for the food process lines that dispenses a unit of a food product on the process line from the bottom of a bulk hopper.

The subject matter herein provides improvements to the efforts disclosed by commonly-invented, commonly-owned U.S. Pat. No. 8,678,886—Robert G. Nothum, Jr., entitled "FOOD PRODUCT LOADER FOR FOOD PROCESS LINES." The foregoing document is incorporated herein by this reference thereto.

The following distinction in a pair of terms, which might at first encounter be confusingly similar, will be continued here. The term 'line' refers to a line of food process machines and the term 'lane' refers to single file aisle of food product pieces on, for example, a conveyor of the food process line. Hence the subject matter herein deals with in part, plural lanes of food product pieces on a food process line.

The above-identified patent recognized various issues at that time, or at least two. First was speed, or the lack thereof. It was disclosed then that the massaging frames were driven in rates of rotation that were slow, perhaps a little faster than a rotisserie for a barbeque grill, but not by much. So hence for any food process line, there is a bottleneck problem. The speed of the whole food process line is determined by the slowest piece of machinery. If most of the machines can run at 5,000 lbs/hr throughput of food product, perhaps even 10,000 lbs/hr, the food process line as a whole can only run 3,000 lbs/hr if that is the speed of the slowest machine.

Second issue concerns not a whole "line" issue but instead a "lane" issue. The individual dispensers for each lane were recognized to clog with bunched pieces of food product that the above-identified patent disclosed sensors to detect if any single lane was empty of food product pieces. Because if it was, the odds were that the problem was due to clogging in that dispenser, and hence there were automatically-driven plungers which were deployed to un-block and clear the clogged dispenser.

And so on, it being an object of the present invention to provide various improvements to a food product loader for food process lines.

As before, the representative food product pieces are boneless, skinless meat pieces in strip form. As mentioned in the above-identified patent, any reference to a chicken "tender" can mean a number of things. The term "tender" can refer specifically to the true anatomical "tenderloin" of a chicken. Or it can refer to imitations, namely, strips of breast meat (other than the tenderloin) cut to size and shape to simulate the true tenderloin. Regardless, both are boneless and skinless strips of chicken meat that have a shape, limpness and squishiness which makes them hard to handle by certain machines.

The challenges to loading tenders from a bulk hopper result from several factors. For one, chicken tenders have a distinct shape (or form). They are long and thin, hence the other common name for them is "fingers." But they do have something like an elongated tear-drop shape. In the industry, the rounder of the two ends is referred to as the head as the tapered end is referred to as the tail (albeit, these names have nothing to do with the real head and tail of the live bird).

Another factor is the limpness or squishiness of the raw tenders. They have no bones nor any skin, and hence no tissue which gives the tenders any internal rigidity. Any attempts to stand a tender on its head or tail merely results in a collapsed over pile. In a bulk hopper, the tenders just sort of intertwine with one another in a mass like cooked macaroni.

A further factor relates to the slipperiness of raw tenders. True tenders have a smooth side and slightly rougher side. It may be due to these two different textures that, while overall a tender feels slippery like a banana peel, a mass of tenders will kind of adhere to one another.

Given the foregoing, to date there has been no highly satisfactory mechanized way to transfer tenders from a bulk hopper to a wide conveyor belt in a neat orderly fashion. Especially where it is desired to load the tenders in a distributed fashion such that individual tenders are all slightly spaced apart from one another, and smooth side is up.

Standard practice has been to have the tenders manually loaded. This requires room for a team of about a dozen people to stand aside the conveyor, six on each side. The tenders only travel down the line for as long as the team works. In other words, the chicken tenders take breaks along with the team of workers when they take their worker breaks.

It is an object of this invention to provide various improvements in the matters of (and without limitations) some of the following:— the avoidance of two or more pieces clogging in a single funnel;

the achievement of the hoped-for goal that the loading machine would be fully automatic, because in fact early prototypes did require manual inspection, manual attention, and simply manual intervention at times;

the achievement of the hoped-for goal that there would be a fairly regular longitudinal alignment of the elongated food product pieces on the outflow conveyor;

sanitation (eg., ease of cleaning, including related measures like reduced disassembly to clean, and/or swifter disassembly and re-assembly for cleaning);

food product outflow flowrate measurement as well as automatic adjustment of the food product outflow flowrate;

and so on.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of a food product loader in accordance with the invention for food process lines, and assembled in a partial food process line in which the food product loader in accordance with the invention is outputting elongate strip-form food product pieces onto a transfer conveyor in laterally-spaced lanes, longitudinally spaced apart from one another, and aligned in a longitudinal orientation;

FIG. 2 is a perspective view comparable to FIG. 1 except on an enlarge-scale and showing the food product loader in accordance with the invention in isolation, with the transfer conveyor removed from view and with the hood raised as for washing/cleaning service;

FIG. 3 is a schematized sectional view taken along a vertical longitudinal cutting plane through FIG. 2, and perhaps offset in places;

FIG. 4 is an enlarged-scale sectional view of detail on the left in FIG. 3A which concerns (among other matters) the loops of the two outflow conveyors, the assemblage of components which comprise the itemizing componentry, and that includes the massaging frame assembly, the discharge end of the bulk hopper's floor infeed conveyor, and so on;

FIG. 13 is an enlarged-scale sectional view comparable to FIG. 12 except showing better the detail of the massaging frame assemblies interacting with the flexible sidewalls of soft-sided funnels, but like in FIG. 12, showing the timing between the massaging frame assemblies to be the same;

DETAILED DESCRIPTION OF THE PREFERRED EMBODIMENTS

Figure 3A:
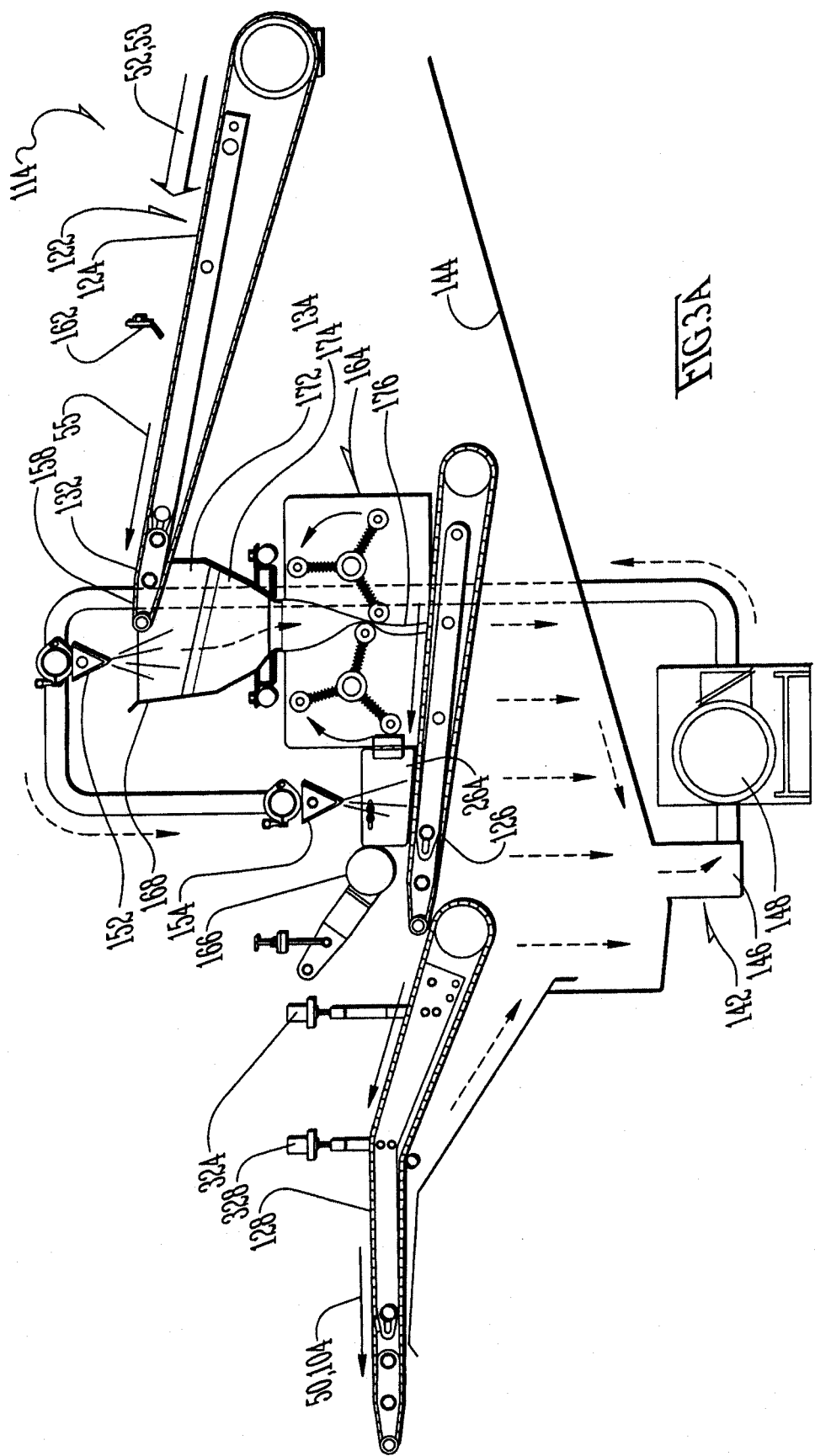
FIG. 3A is an enlarged-scale schematized sectional view of detail in the center of FIG. 3 which concerns the loops of the endless belt conveyors the solution (eg., marinade) recirculation system.

FIG. 1 shows a food product loader 100 in accordance with the invention for food process lines, and as assembled in a partial food process line in which the food product loader 100 in accordance with the invention is outputting elongate strip-form food product pieces 50 onto a transfer conveyor 102.

The elongate strip-form food product pieces 50 have been itemized (individualized, or placed in spaced distribution) by the food product loader 100 to be received by the transfer conveyor 102 (and downline equipment downline from the transfer conveyor 102, but none shown here) in laterally-spaced lanes 104, longitudinally spaced apart from one another, and aligned in a longitudinal orientation.

In this description, illustrated elongate strip-form food product pieces 50 are indicated by reference numeral 50. Any open arrow used to symbolically represent itemized or individual elongate strip-form food product pieces 50 is indicated by reference numeral 51. In contrast, illustrated bulk flow of the elongate strip-form food product pieces 50 (or bulk quantities rather than individual pieces) is indicated by reference numeral 52. Any open arrow used to symbolically represent any bulk flow or quantity of the elongate strip-form food product pieces 50 is indicated by reference numeral 53.

Hence in FIG. 1, a bulk flow 53 of food product is introduced in the upline, infeed side 104 of the food product loader 100, which bulk flow 53 will be itemized and outputted downline in laterally-spaced lanes 104 of elongate strip-form food product pieces 50, longitudinally spaced apart from one another, and aligned in the longitudinal orientation. The bulk flow 53 of food product is originally introduced into the internals of the food product loader 100 down a slide 110 on the upline end 106 thereof.

FIG. 2 shows the food product loader 100 in isolation, with the transfer conveyor 102 removed from view and with the hood 112 raised as for washing/cleaning service. FIG. 3 shows better various ones of the internal components 114 of the food product loader 100, including (among others) as follows.

The food product loader 100 has an assemblage of components 114 comprising what is termed here for convenience as itemizing "componentry," which includes an infeed hopper 122.

The food product loader 100 has three endless belt conveyors 124, 126 and 128 in series, one being an infeed conveyor 124 to the itemizing componentry and the other two being outflow conveyors 126 and 128, namely:—
- an infeed conveyor 124 for the infeed hopper 122, which infeed conveyor 124 has an upper food product carrying run 132 scraping across an inclined floor 134 (eg., stainless steel panel) for the hopper 122;
- an upline outflow conveyor 126 onto which the itemized food product pieces 50 are originally distributed across; and
- a downline outflow conveyor 128 (which is also a weighing conveyor) from which food product pieces 50 are ultimately discharged from the food product loader 100.

FIG. 3 further shows that the cabinet 136 for the food product loader 100 provides a compartment 138 for a vacuum (or suction) motor 140 for suctioning in an infeed bulk flow 53 of food product pieces. The bulk supply is typically supplied in the form slurry-like heaps of food product pieces 50 contained in bins or carts (not shown) that are stored in the food processing plant's refrigerated storage until the bulk supply is needed to furnish the food product loader 100. A cart or bin (not shown) might be wheeled, and it might be as simply as manually pushed to the slide 110 at the infeed end 106 of the food product loader 100. After that, a vacuum syphon (or conduit of some sort) might be sunk into the bin or cart, and a bulk stream 53 of food product is withdrawn out of the bin and exhausted out onto the slide 110 of the food product loader 100. None of this is shown, but these sort of vacuum systems are known to fish hatcheries, like trout hatcheries for stocking populations for sportfishing purposes. So these types of vacuum systems are surprisingly gentle to the objects being suctioned and transferred, inasmuch that ten inch long trout readily survive such handling.

In any event, it is an aspect of the food product loader 100 in accordance with the invention to provide an onboard vacuum pump 140, as it is believed that the vacuum pump 140 represents the greatest capital cost in such vacuum systems, the conduits and separation chambers being far less costly.

Figure 4:
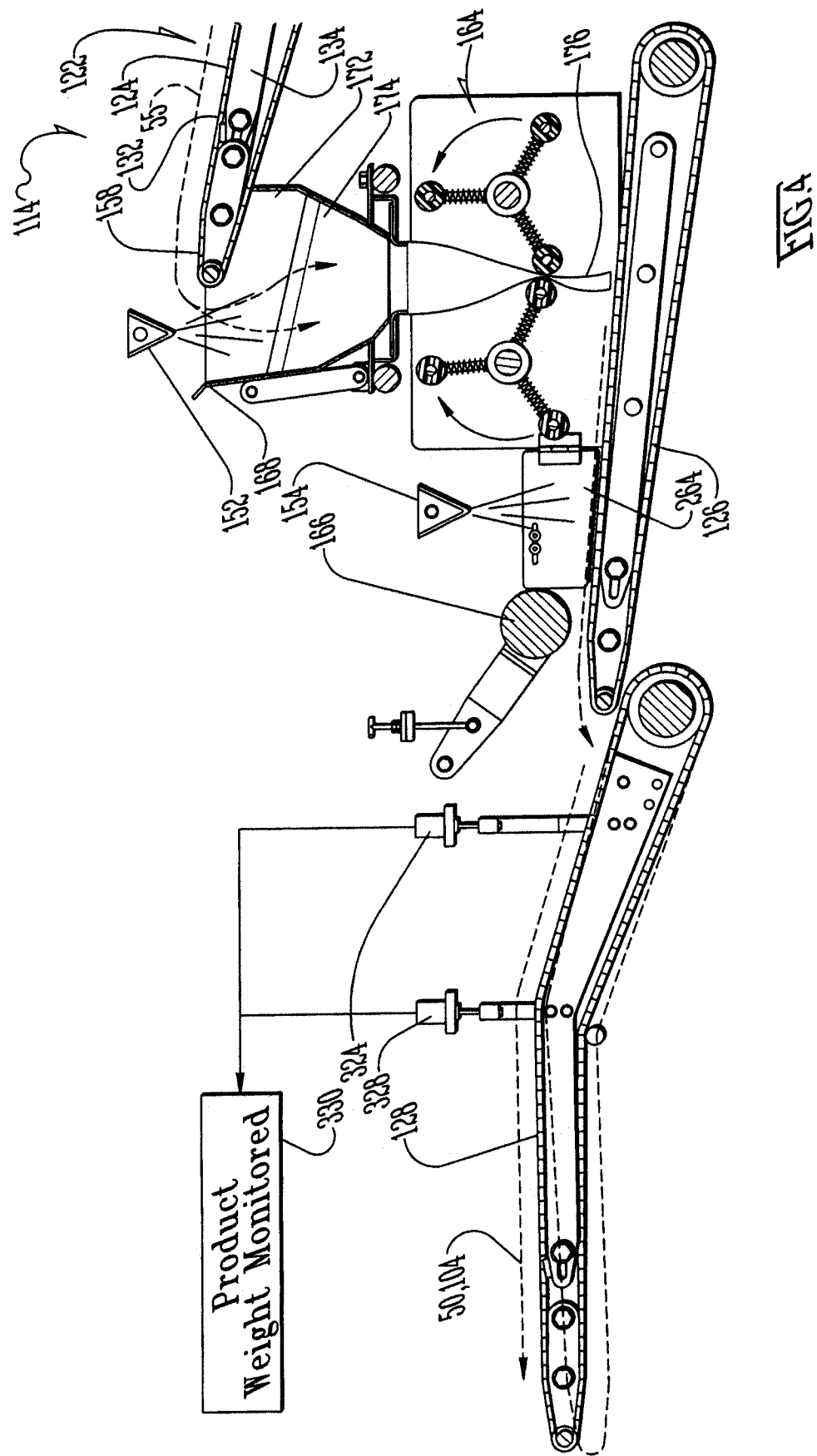
Figure 5:
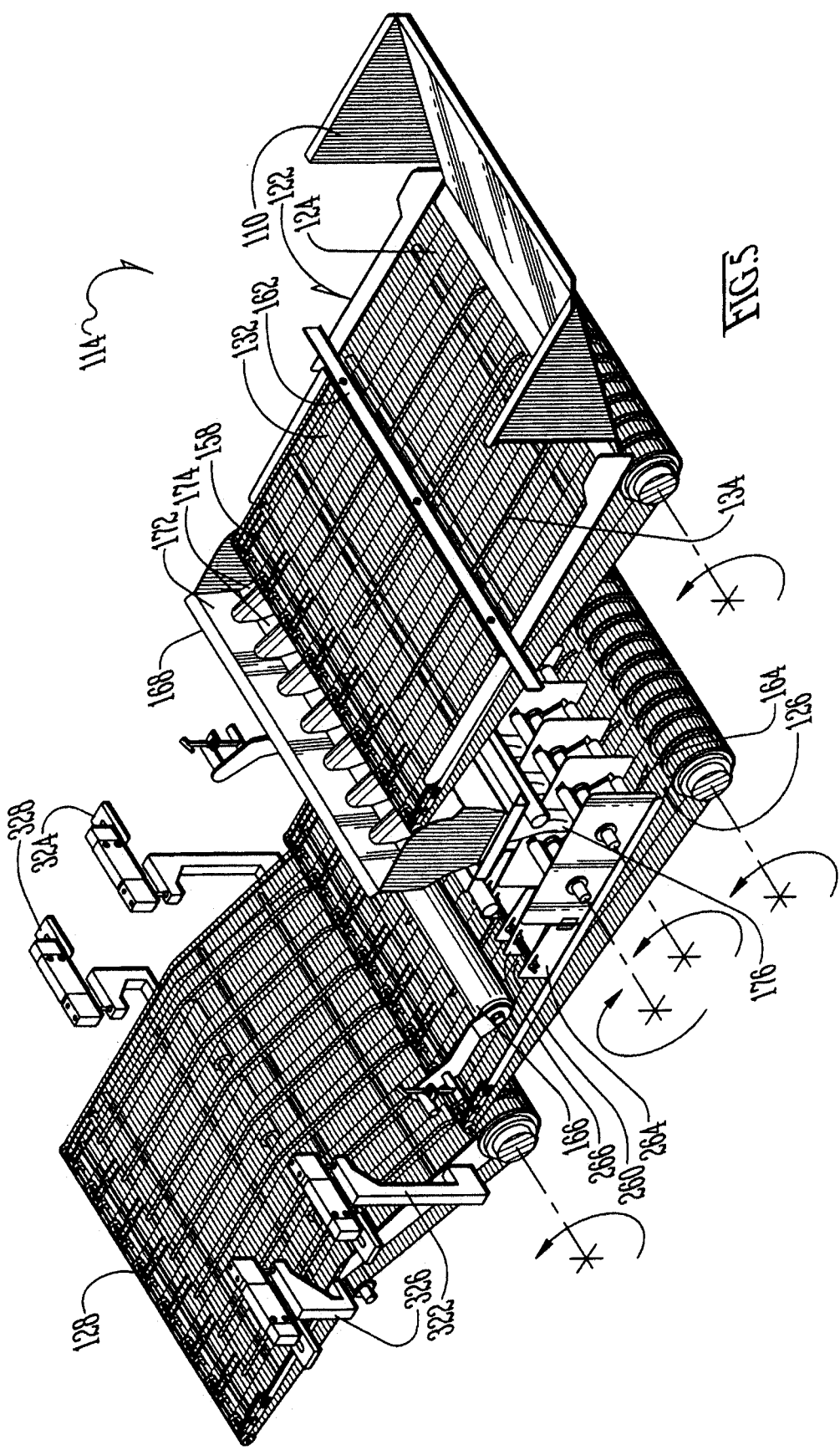
FIG. 5 is a top perspective view of the belt conveyors, the itemizing componentry, a compression roller and the like in isolation.

FIG. 3A is a schematic view showing better a moisture or solution (eg., a marinade) recirculation system 142 for the food product loader 100 in accordance with the invention. FIG. 4 is similar but is an illustration, and in section in part. FIGS. 3A and 4 will be discussed more particularly below following a discussion of the figures up through FIG. 12. But FIGS. 3A and 4, for now, will provide an introduction to the solution (marinade) recirculation system 142.

It is an aspect of the present invention that the value of the constant spraying of solution (moisture) onto the food product 50,51 pieces improves the itemizing operations of the itemizing componentry 114. The solution serves as a lubricant, albeit the solution is largely water-based. So in use, solution is generously sprayed in two especially strategic locations. It is also advantageous to season the solution in part. Hence the generous spraying of solution also serves a second function as marinading the food product pieces 50 at the same time.

The three aforementioned endless belt conveyors 124, 126 and 128 for the food product loader 100 preferably comprise without limitation wire mesh belts. These wire mesh belts readily allow water/solution to pour through. Hence the interior of the cabinet 136 for the food product loader 100 is configured in the upper half as a water vessel, with a V-shaped vessel bottom wall 144 draining into a laterally-extending return gutter 146. The return gutter 146 provides a renewed supply of solution to a recirculation pump 148. The recirculation pump 148 pumps up solution by return conduits to at least a first and second laterally extending spray arm 152 and 154.

FIGS. 3, 3A and 4 (being side views) furthermore show the relations among the two outflow conveyors 126 and 126 to the assemblage of components 114 which comprise the itemizing componentry.

With general reference to FIGS. 3 through 12, the itemizing componentry 114 includes the discharge end 158 of the bulk hopper 122's floor infeed conveyor 124, a leveler bar 162 therefor (see FIGS. 3 and 5-6), a massaging frame assembly 164, an exit compression roller 166, and so on as more particularly described next.

Figure 6:
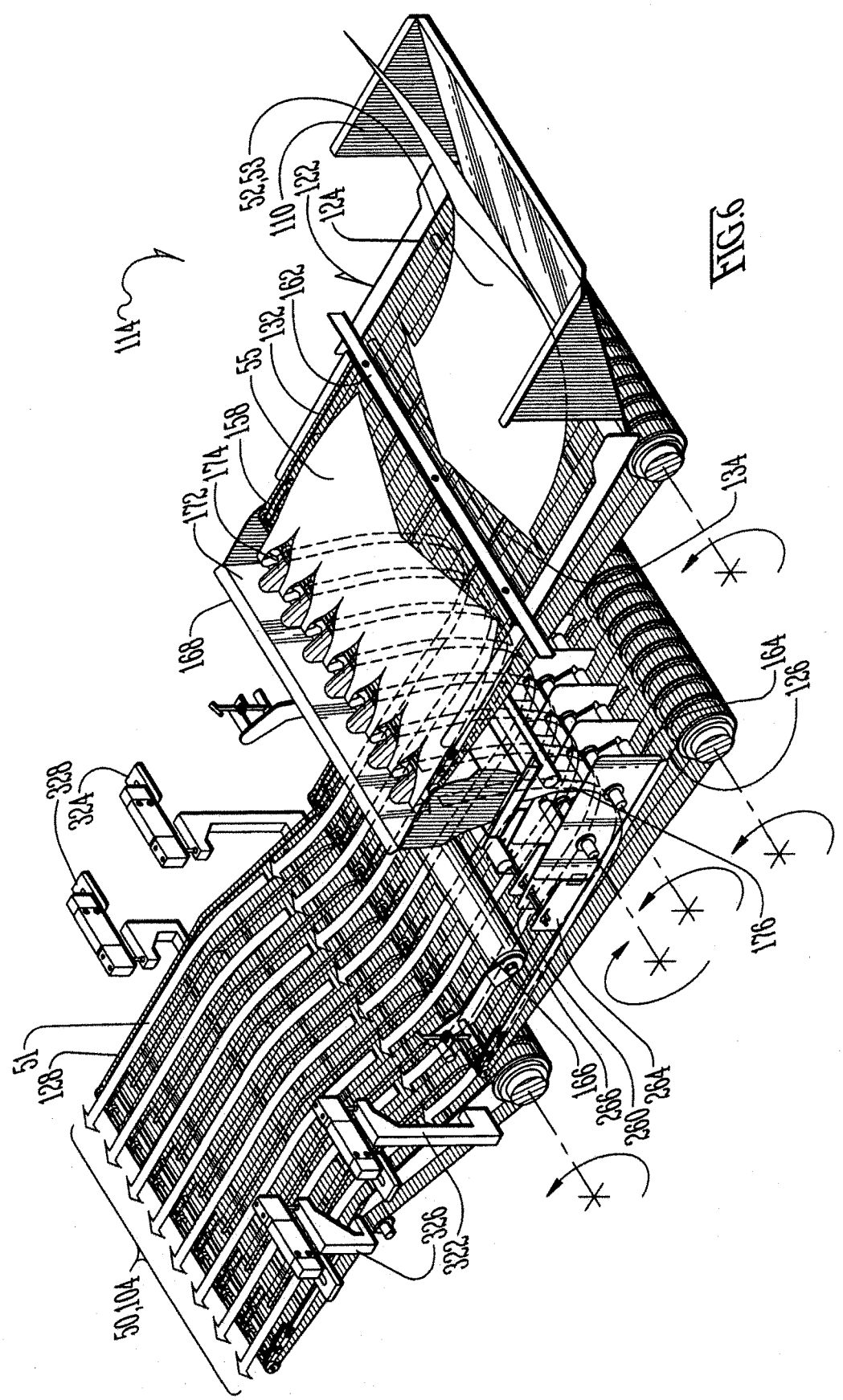
FIG. 6 is a perspective view comparable to FIG. 5 except showing the bulk in-flow of food product as a broad open arrow flowing over the floor inflow conveyor of the bulk hopper (which broad open arrow is partitioned in two between an upline (right upper) portion and a downline (left lower) portion), and further showing the itemization and discharge of individual food product pieces in the itemizing componentry, which is represented as being outputted onto the outflow conveyors in a plurality of lanes as elongate open arrows (which are also longitudinally partitioned merely so as to not obscure all underlying detail)
Figure 7:
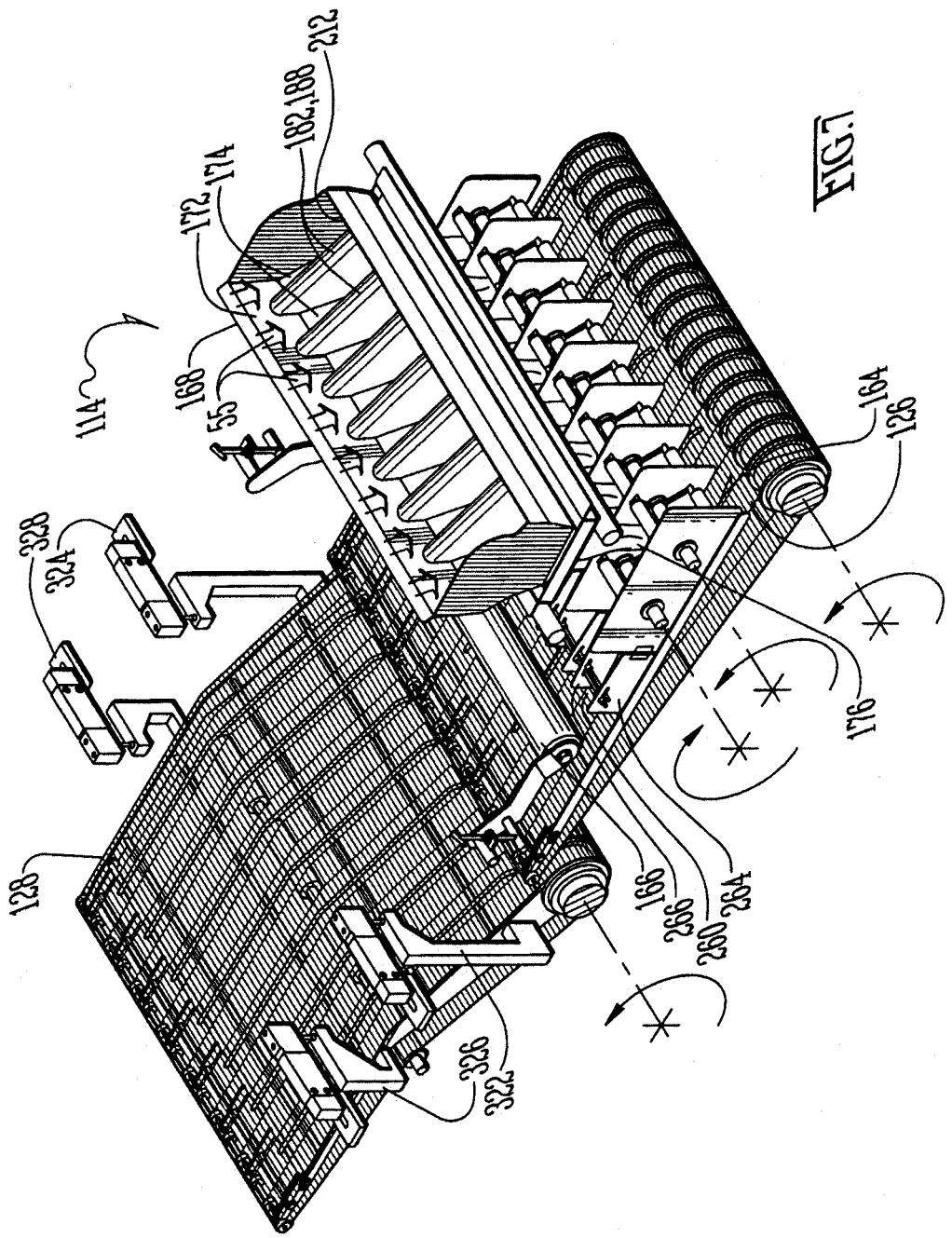
FIG. 7 is a perspective view comparable to FIG. 6 except with the open arrows that simulated food product flow-path are removed from view, as well as is the bulk hopper and its floor inflow conveyor.

FIG. 6 shows the bulk in-flow 53 of food product as a broad open arrow flowing originally down the slide 110 and the up on top of the upwardly inclined floor 134 inflow conveyor 124 of the bulk hopper 122. The bulk in-flow 53 is indicated by broad open arrow which is partitioned in two between an upline (right upper) portion 53 and a downline (left lower) portion 55. The two portions 53 and 55 of the broad open arrow are partitioned by the underpassing flow 55 under the leveler bar 162.

The bulk flow 55 then pours over the discharge end of the infeed hopper 122's floor infeed conveyor 124 in a laterally-thinned sheet 55 into an open-topped hard-walled trough 168. FIGS. 7-8 and 11-12 show that the trough 168 has a common headspace 172 that transitions into a plurality of laterally-divided chutes 174. Here (for example's sake), there are eight laterally-spaced chutes 174 feeding eight laterally-spaced soft-sided funnels 176 feeding eight laterally-spaced outflow lanes 104.

The trough 168's common overhead headspace 172 transitions into a laterally-spaced series of gently rounded crests 182, the downslopes 184 of which fall into one or the other of the eight laterally-spaced hard-walled chutes 174. The crests 182 are not only laterally-rounded with downslopes plummeting into one or the other of the laterally-spaced hardwalled chutes 174, the crests 182 are also longitudinally inclined from the upline to downline direction. That way, that no individual piece 50 of food product finds a stable perch for very long on any crest 182. That is, each individual food product piece 50 will likely be urged by another piece landing on top of it to fall immediately into one chute 174 or the other, or else slide down the spine 188 of the crest 182 to the upline end 212 until that food product piece 50 ultimately loses the battle against keeping its balance. Ultimately, every food product piece 50 is expected to find its way downward into a chute 174. On average (ie., weight or mass average), the bulk flow 55 will be laterally divided into about equal eighths into one each of the eight chutes 174. The chutes 174 taper inwardly downwardly in the longitudinal direction to terminate in eight laterally spaced outlet ports 214 aligned in a common elevation.

Figure 8:
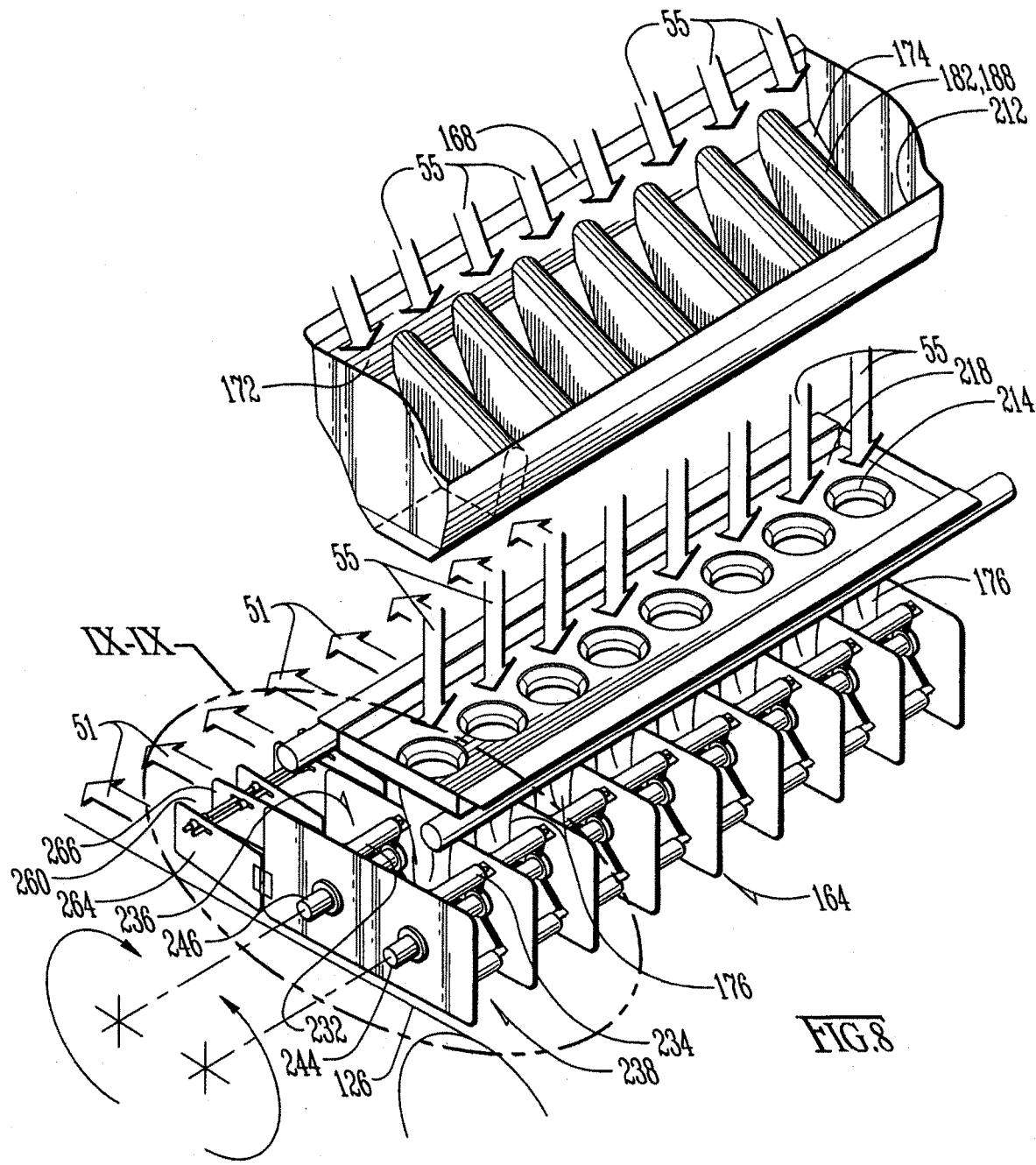
FIG. 8 is an enlarged-scale exploded perspective view of the itemizing componentry in isolation, for piece-by-piece itemization of food product pieces.
Figure 11:
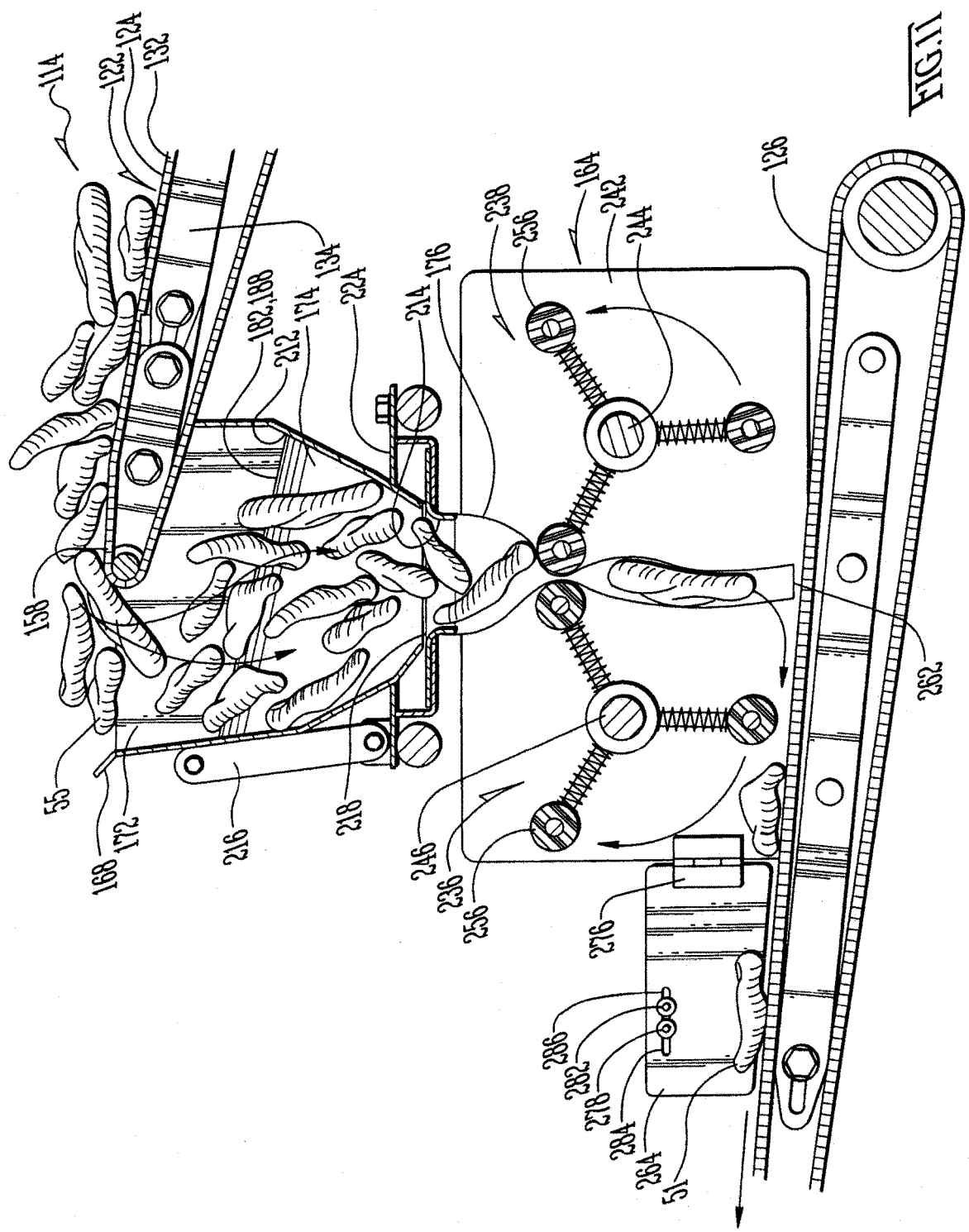
FIG. 11 is an enlarged-scale sectional view comparable to FIG. 4 except just of the detail of the right one-third thereof and with individual food pieces included in the view, but in which the overhead spray arm has been removed from view.

As FIG. 11 shows better that the trough 168 is mounted on hinges 216. FIG. 8 shows a representation that the trough 168 separates for cleaning/washing operations. Not shown in FIG. 8 or 11 is that the trough 168 pivots up counter-clockwise in these views.

The trough 168 discharges streams of food product pieces 50 out of each of its plurality (eg., eight) chutes 174 into a funnel assembly 224 that is provided with a like number (eg., eight) of soft-side funnels 176. These soft-sided funnels 176 can be likened to icing-dispensing funnels for cake decorators.

The funnels 176 have a common header 218 which is a planar panel (or panel-form) that slides into a use position and out for removal from one side of the food product loader 100. The common header 218 can be made of stainless steel sheet with the soft-sided funnels 176 adhered thereto. It is preferred to make the header 218 and soft-side funnels 176 as a monolithic whole of polymeric material. It is also intended that the funnel assembly 224 is largely a use-once and discard component. That is, with each washing/cleaning cycle, the hardwalled trough 168 will be sanitized re-deployed while in contrast the funnel assembly 224 will be discarded and replaced with a fresh new one.

As individual pieces 50 of elongate food product migrate down the tapering chutes 174 and then the soft-sided funnels 176, the pieces 50 begin to naturally distance from each other and nearly form a single-file downstream of pieces 50.

There are a pair of laterally-extending, longitudinally-spaced massaging frame assemblies 232 and 234 flanking the row of the plurality of soft-sided funnels 176 on an upline side and downline side respectively.

It is a further aspect of the present invention that the massaging frame assemblies 232 and 234 are partitioned into a plurality of laterally-spaced sections 236 and 238. Preferably each of the upline massaging frame assembly 232 and downline massaging frame assembly 234 provides an upline and downline counterpart section 236 and 238, respectively, for each lane 104. The sections 236 and 238 are partitioned by stationary (preferably stationary) lane dividers 242.

Each massaging frame assembly 232 and 234 comprises a rotating shaft 244 and 246. The upline shaft 244 rotates counterclockwise in the figures, and the downline shaft 246 clockwise in the figures. Each shaft 244 and 246 carries a multiplicity of elongate spokes 248. The spokes 248 extend from bases 252 anchored each spoke 248's respective shaft 244 or 246. The spokes 252 terminate in terminal ends 254 which support laterally elongate cross-bars, or paddles 256.

The upline and downline massaging frame assemblies 232 and 234 counter-rotate into each other as shown. A given upline massaging frame section 236 in a given lane 104 and the counterpart downline massaging frame section 238 in the given lane 104 provide a downward massaging stroke on the respective soft-side funnel 176 in the same given lane 104. The massaging stroke serves not only as an urging force to urge one single elongate food piece 50 down at a time below a plane containing both drive shafts 244 and 246, but also serves a check valve function to hold back the next successive single piece 50 of elongate food product.

So again, improvements have been made and/or learned with respect to massaging frame assemblies 232 and 234 configuration and rotation timing.

The massaging frame assemblies 232 and 234 here, for example and without limitation, present rotating paddles 256 angularly spaced every 120° apart. In other words, each section 236 and 238 of the massaging frame assemblies 232 and 234 present three equally angularly-spaced apart paddles 256 for every rotation. Configurations can be varied with less than three paddles 256 or more than three paddles 256 for each revolution, but three are shown here for example and without limitation.

In the previous patent, each paddle was an elongate monolithic unit extending laterally across all the lanes 104. Here, an improvement in accordance with the invention resides in part in that such monolithic paddles are sub-divided here into sections 236 and 238 according to one section 236 or 238 for each lane 104.

Each massaging frame assembly 232 and 234 comprises a central drive shaft 244 and 246 and then also paddles 256 per section 236 or 238 numbering "X" paddles 256 per revolution (eg., three here) times number of lanes 104 (eg., "N," or eight here). Therefore, in the non-limiting exemplary configuration here, there are twenty-four paddles 256 per massaging frame assembly 232 or 234. Each massaging frame assembly 232 and 234 further comprises not only the central drive shaft 244 or 246 but then also a pair of spokes 248 for each paddle section 236 or 238. Wherein, given the twenty-four paddles 256 here per massaging frame assembly 232 or 234, that makes forty-eight spokes 248 per massaging frame assembly 232 or 234.

Whereas in the earlier patent, each paddle for a massaging frame assembly might be a monolithic unit about as long as the drive shaft, the counterpart paddle presentation is sub-divided laterally into "N" sections, wherein "N" corresponds to number of lanes 104, hence eight laterally-divided sections 236 or 238. With "X" (or three) paddles 256 in each of the "N" (or eight) lanes 104, then in other words there are three paddles 256 in each section 236 or 238 of a massaging frame assembly 232 or 234. The "X" paddles 256 are angularly uniformly spaced apart from one another (here, 120° apart).

Figure 9:
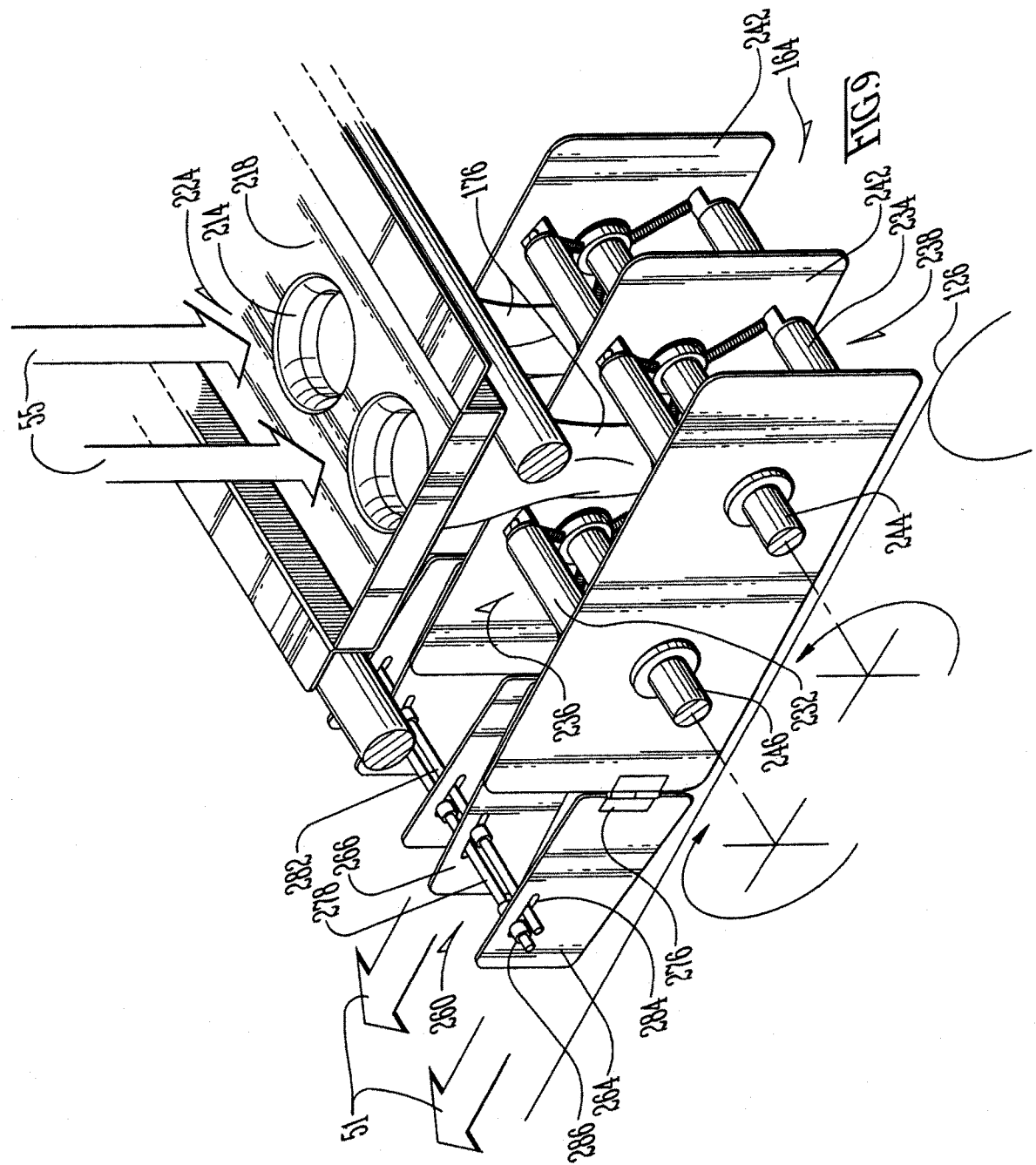
FIG. 9 is an enlarged-scale exploded perspective view that is comparable to FIG. 8 except just of a lower-left corner detail thereof.

FIG. 9 shows better two laterally-divided sections 236 and 238 of both the upline and downline massaging frame assembly 232 and 234, which here are the outboard leftmost section 236 and 238 and then the section 236 and 238 immediately inboard of that. These might be numbered arbitrarily as lanes "1" and "2" of the "N" lanes 104 (eg., eight here).

Figure 10:
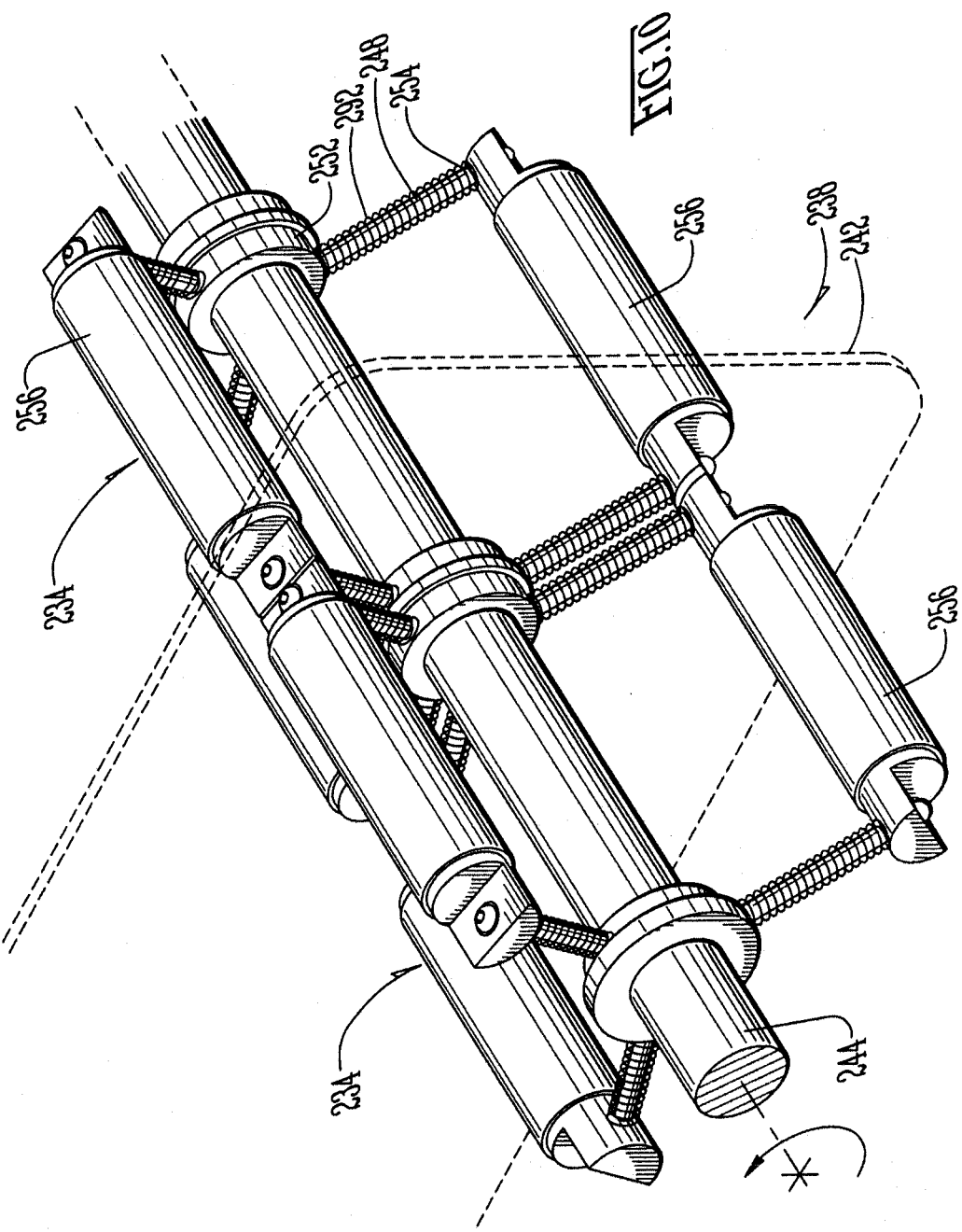
FIG. 10 is an enlarged-scale exploded perspective view that is comparable to FIG. 9 except just showing two laterally-divided sections of the massaging frame assembly (ie., the outboard leftmost section and then the section immediately inboard thereof), and which laterally-divided sections are components of the greater massaging frame assembly as a whole (ie., only the limited sections referenced here are shown)

FIG. 10 is an enlarged-scale view of just the two sections 238 of the downline massaging frame assembly 234 shown in FIG. 9 now also shown in isolation.

FIG. 11 is a sectional view comparable to FIG. 4 except on an enlarged-scale as well as showing just of the detail of the right one-third thereof, and, with individual food pieces 50,52 included in the view (but in which in FIG. 11 the overhead spray arm 152 has been removed from view).

Figure 12:
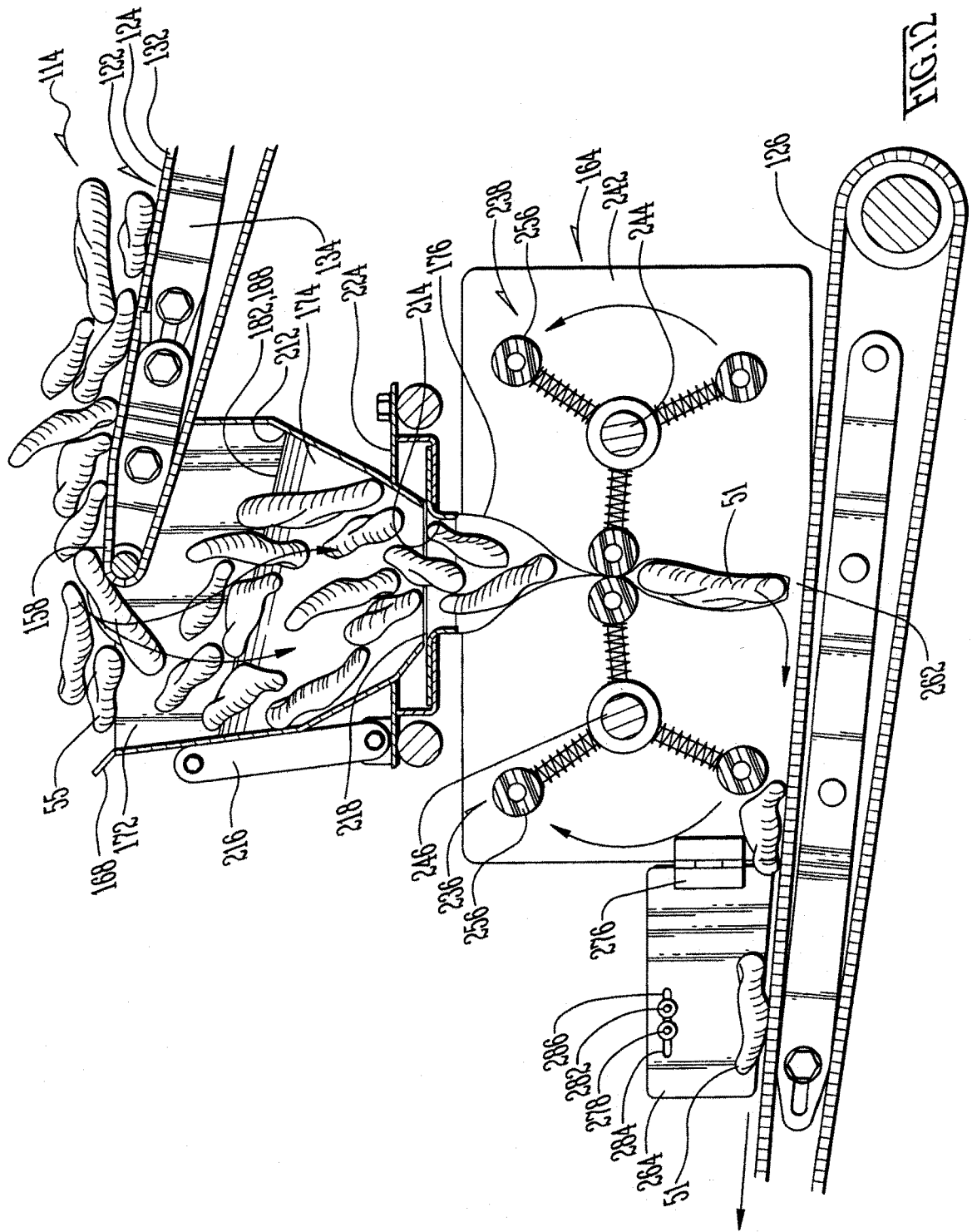
FIG. 12 is a sectional view comparable to FIG. 11 except showing the downline and upline massaging frame assemblies respectively rotated about 10° ahead of their position in FIG. 11 (wherein the respective positive direction of rotation for each massaging frame assembly is indicated by arrows in the view, which is clockwise for the downline massaging frame assembly and counterclockwise for the upline massaging frame assembly)

FIG. 12 is a sectional view comparable to FIG. 11 except showing the upline and downline massaging frame assemblies 232 and 234 respectively rotated about 10° ahead of their position in FIG. 11. One individual piece 50 of elongate food product will be massaged below the plane containing in common the drive shafts 244 and 246 of the massaging frame assemblies 232 and 234. Henceforth, that individual piece 50 of elongate food product will be deposited on the upper food-product carrying-run 258 of the upline outflow conveyor 126.

FIG. 9 shows better that just downline of the bottom ports 262 of the "N" soft-sided funnels 176 are "N" collimating channels 260 disposed above the plane of the upper food-product carrying-run 258 of the upline outflow conveyor 126.

Each collimating channel 260 comprises a left-side sidewall (or leaf) 264 and right-side sidewall (or leaf) 266. These sidewalls 264 and 266 can be alternatively referred to as leafs 264 and 266 because they are adjustable and can be swung left to right in shallow angles:—in pairs like the leafs of a hinge.

So in FIG. 9, the collimating channels 260 for lane "1" and lane "2" are in view. The collimating channels 260 for the remainder of the lanes 104 are not shown as completely here in FIG. 9 for lanes "1" and "2," so these collimating channels 260 shown here are representative of the others.

In FIG. 9, the left and right leafs 264 and 266 of the collimating channel 260 for lane "1" can be adjusted to swing toward each other (or away from each other). The swung apart extreme would have the left and right leafs 264 and 266 about parallel to each other. The extreme for the leafs 264 and 266 being swung toward each would form an inward taper or bottleneck. That way, if a single piece 50 of elongate food product landed in lane "1" of the upline outflow conveyor 126 in a crescent shape, the left and right leafs 264 and 266 of the collimating channel 260 of lane "1" would straighten the piece 50 of elongate food product and collimate in a parallel pattern with the other pieces 50 of elongate food product in lanes "2" through "N" for that row 58 of food product pieces 50. See, for example, FIG. 18.

Staying in FIG. 9, note that the right leaf 266 of the collimating channel 260 of lane "1" is paired with the left leaf 264 of the adjacent collimating channel 260 of lane "2." And this repeats for each right and left leaf 266 and 264 of adjacent collimating channels 260, wherein only the left leaf 264 of the leftmost outboard lane and right leaf 266 of the rightmost outboard lane are not paired like this.

Nevertheless, for each such pairs of leafs 266 and 264 in adjacent lanes 104, these leafs 266 and 264 swing with respect to each other like the leafs of a hinge. The non-limiting disclosure here has each leaf 266 and 264 independently mounted to its own hinge 276, and it is hinged to the downline (front) margin of the lane dividers 242 for the sections of the massage frame assemblies.

FIG. 9 also show that all the leafs 264 and 266 are driven by one or the other of two elongate laterally extending drive rods 278 or 282. All the leafs 264 and 266 have a slot aperture 284 to allow the extension of the drive rods 278 and 282 therethrough. Both drives rods 278 and 282 have reversible thrusting drive strokes. One drive rod 278 drives all of the left leafs 264 only. The other drive rod 282 drives all of the right leafs 266 only. Each drive rod 278 and 282 grasps its respective set of left leaves 264 or only or right leafs 266 only by miniature shaft collars 286 flanking both sides of the respective leaf 264 or 266 proximate the slot aperture 284.

In this fashion, the collimating channels 260 can be focused to make a relatively narrow choke point (bottleneck) for the pieces 50 of elongate food product headed downstream. FIG. 4 shows better that, immediately downstream from the downline (front) edges of the collimating channels 260, the food product loader 100 in accordance with the invention includes a compression roller 166. Again, the compression roller 166 is disposed above the plane of the upline outflow conveyor 126 at the exit of the collimating channels 260. The clearance is adjustable between the compression roller 166 and the upper food-product carrying run 258 of the upline outflow conveyor 126. The drawings show a turnbuckle like adjustment provision but this is shown for example and is not limiting. In any event, it is preferred to apply some measure of compression to the downstream flowing food product pieces 50 downstream from the collimating channels 260 (immediately downstream as shown here).

Pause can be taken to return to the subject matter of the solution recirculation system 142. FIGS. 3A and 4 show better that the two laterally elongated spray arms 152 and 154 disposed in particular locations. One spray arm 152 extends laterally over the open headspace 172 of the infeed trough 168 and sprays generous amounts of solution into the trough 168 and onto the bulk flow 55 of food product into and through the trough 168. The other spray arm 154 extends laterally over the open collimating channels 260 and sprays generous amounts of solution into the collimating channels 260 and onto the itemized flow 50,51 of food product through the collimating channels 260.

Evidently, there is no upper limit of how much spraying is too much. The lubrication works wonders to prevent clogging and promote uniform alignment. The solution is recirculated in the food product loader 100 in any event and so excess is not being sent downline to equipment further downstream.

Figure 13:
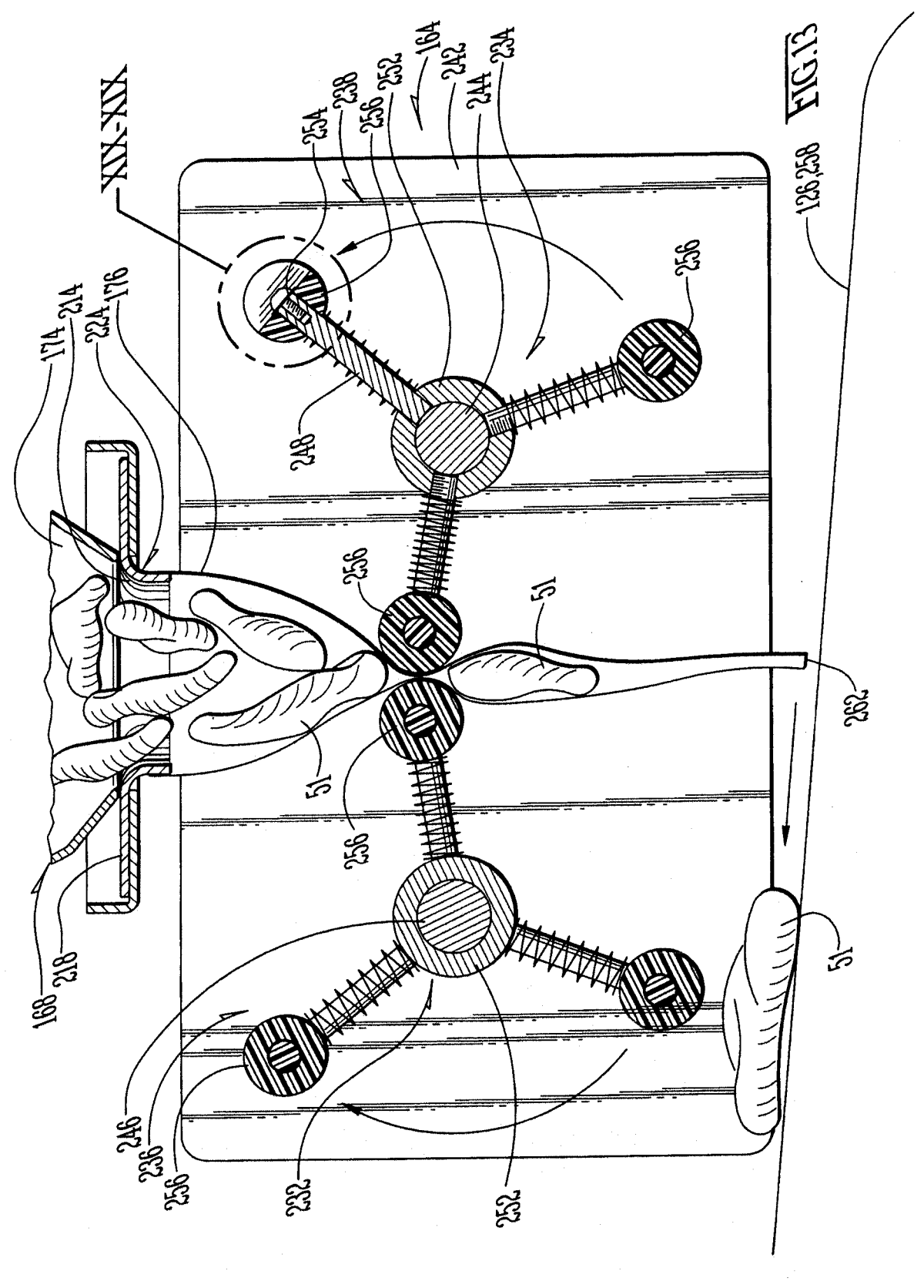

FIG. 13 is an enlarged-scale sectional view comparable to FIG. 12 except showing better, for a given lane 104, the detail of the counterpart sections 236 and 238 of the upline and downline massaging frame assemblies 232 and 234 interacting with the flexible sidewall of a soft-sided funnel 176. As for a given lane 104, it can be assumed for example's sake and without limitation that this is lane "1." But what is shown in FIGS. 13-17 is representative for all the lanes 104.

FIG. 13 shows the timing between the upline and downline massaging frame assemblies 232 and 234 to be more or less the same as in FIG. 12, except in detail on an enlarged scale. The cross bar 256 for the downline massaging frame assembly 234 at the (nearly) 3 o'clock position and the cross bar 256 for the upline massaging frame assembly 232 at the (nearly) 9 o'clock position are driving into each other.

Figure 19:
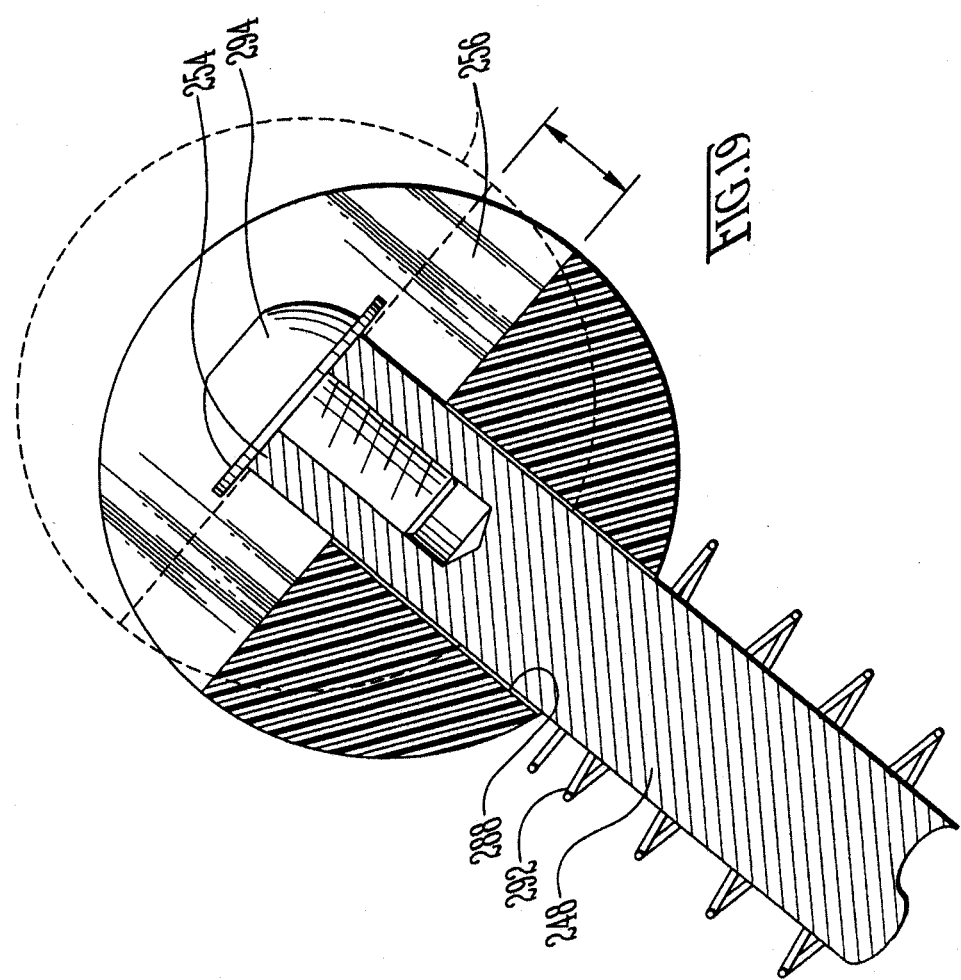
FIG. 19 is an enlarged-scale sectional view of detail XIX-XIX in FIG. 13.

As FIG. 10 shows better, each cross bar 256 is carried at the ends 254 of a pair of spokes 248. This is like a soccer goal, with two spaced posts carrying a cross bar. However, as FIG. 19 shows, the cross bar 256 has a through bore 288 at both ends (only one shown here) for a sliding connection with the cylindrical spokes 248. A coil compression spring 292 urges the cross bar 256 into a radially distant extreme position, with is limited by a stop provision 294 like the head of a cap screw (e., or a washer 294 or else like the head of a truss head cap screw).

FIG. 19 also shows that the cross bar 256 can be displaced on the spoke 248 in the radial direction inwards towards the respective drive axle 244 or 246.

FIG. 13 shows exactly that scenario. The cross bar 256 for the downline massaging frame assembly 234 at the (nearly) 3 o'clock position and the cross bar 256 for the upline massaging frame 232 assembly at the (nearly) 9 o'clock position are driving into each other, and, mutually displacing each toward each's respective drive axle 246 and 244, respectively. That is, the distance between these two cross bars 256 and each cross bar 256's respective drive axle 246 and 244 is respectively foreshortening.

It is an aspect of the invention to isolate cross bars 256 into sections 236 and 238 into individual lanes 104 so that the relative foreshortening of what occurs in lane "1" does not carryover into lane "2" or any of the other lanes 104. So each section 236 and 238 of mutually displacing cross bars 256 operates independently in its own lane 104, with no information coming over from any other lane 104. Whereas the lane dividers 242 serve several purposes, one purpose is to further isolate each upline and downline counterparts of sections 236 and 238 of the massaging frame assemblies 232 and 234 operatively isolated within their own respective lanes 104 only.

Note also that the timing of the timing of the upline massaging frame assembly 232 might be 1° or so (one degree) behind the downline massaging frame assembly 234. In other words, they are not perfectly in unison, although very nearly so.

Figure 14:
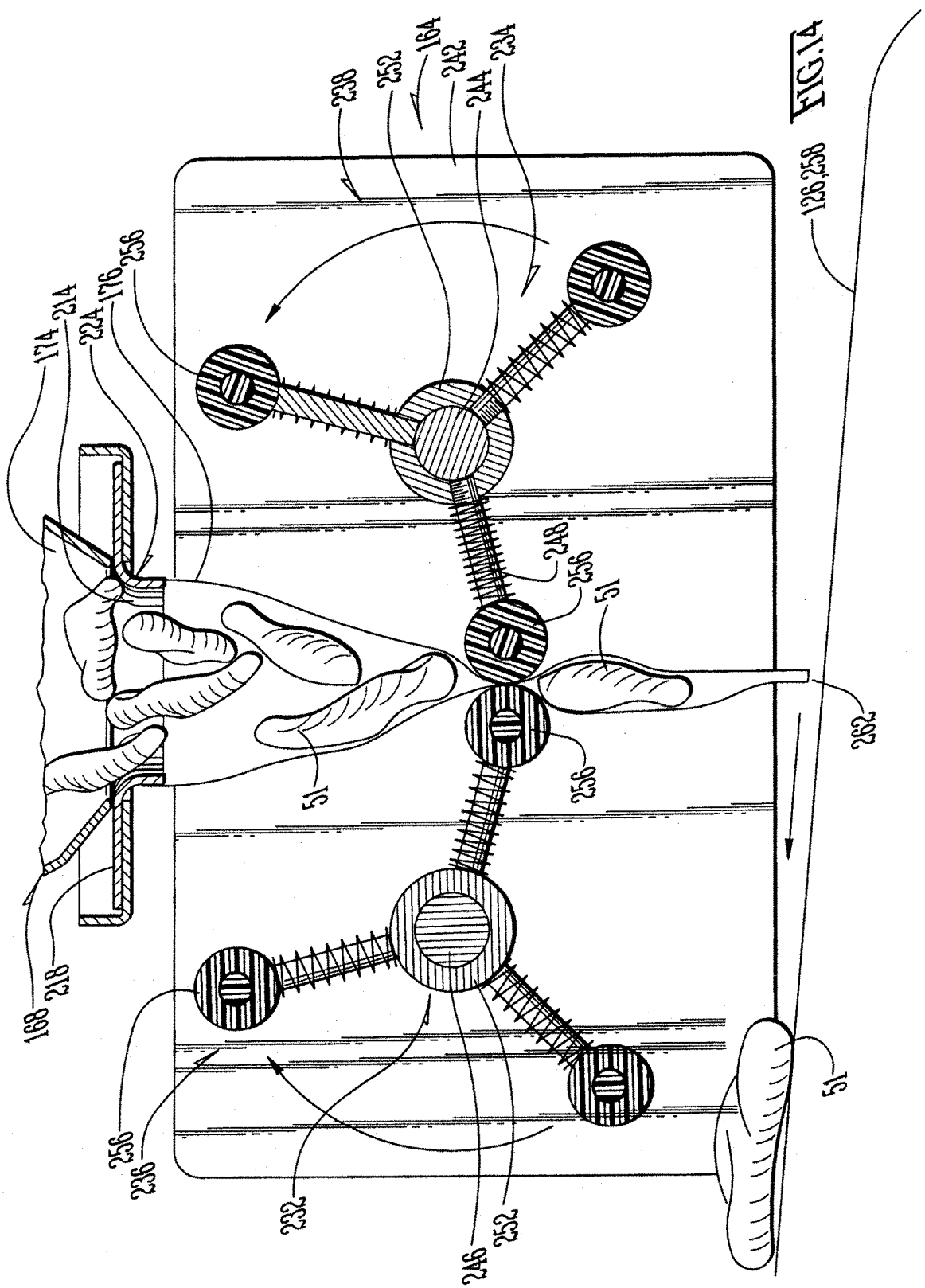
FIG. 14 is a sectional view comparable to FIG. 13 except showing the timing for the downline and upline massaging frame assemblies to have positively advanced by about 10° ahead of their position in FIG. 13.

FIG. 14 is a sectional view comparable to FIG. 13 except showing the timing for the downline and upline massaging frame assemblies 234 and 232 to have positively advanced by about 10° ahead of their position in FIG. 13. Now the two mutually displacing cross bars 256 (eg., formerly the cross bar 256 for the downline massaging frame assembly 234 at the ~3 o'clock position and the cross bar 256 for the upline massaging frame assembly 232 at the ~9 o'clock position) are now below the common plane containing both drive shafts 246 and 244. And these two mutually displacing cross bars 256 are starting to disengage.

Figure 15:
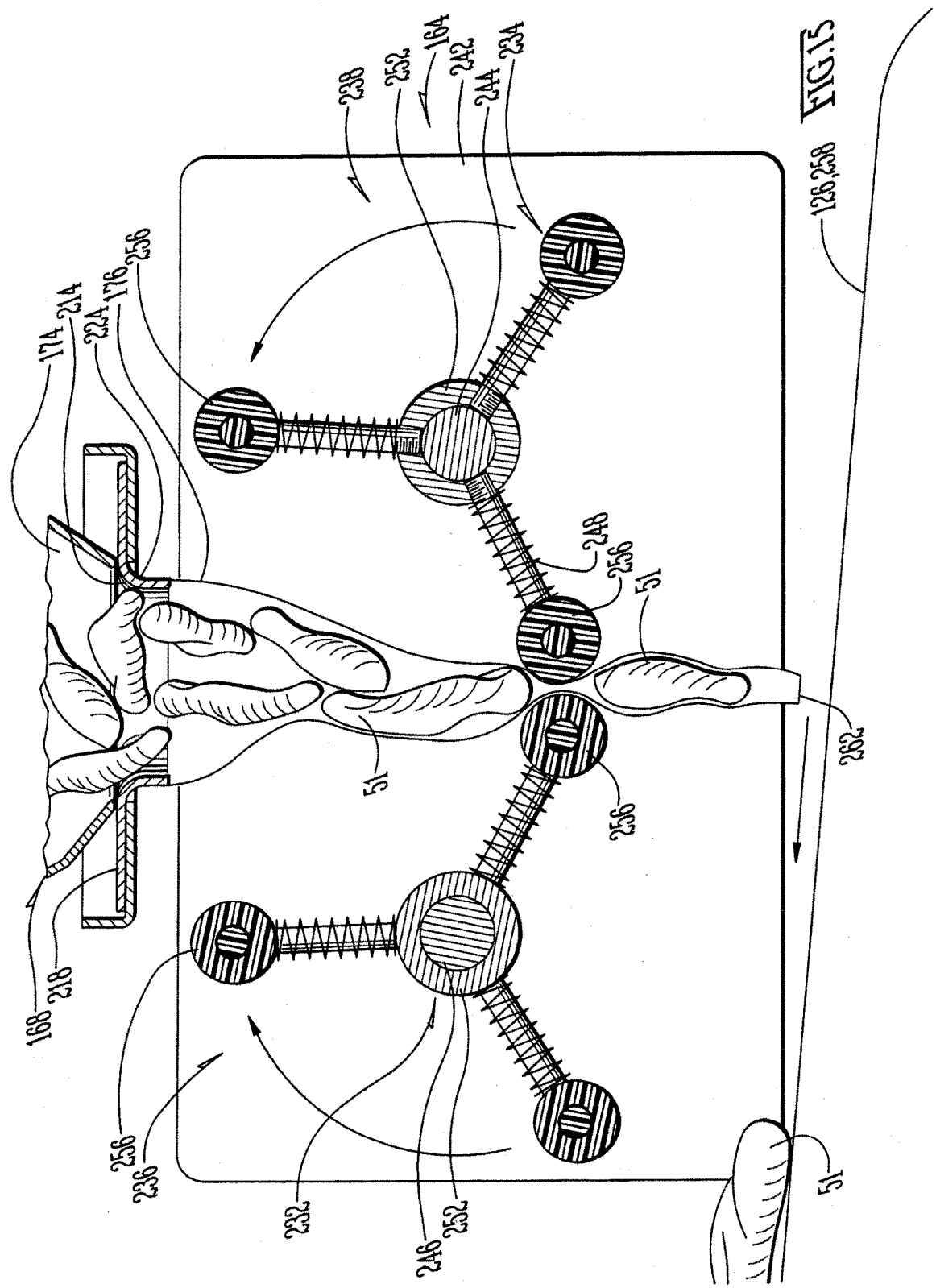
FIG. 15 is a sectional view comparable to FIG. 14 except showing the timing for the downline and upline massaging frame assemblies to have positively advanced by about another 10° ahead of their position in FIG. 14.

FIG. 15 is a sectional view comparable to FIG. 14 except showing the timing for the downline and upline massaging frame assemblies 234 and 232 to have positively advanced by about another 10° ahead of their position in FIG. 14. The two cross bars 256 of interest have disengaged, and, have returned to their extreme distant limit on their respective spokes 248.

Figure 16:
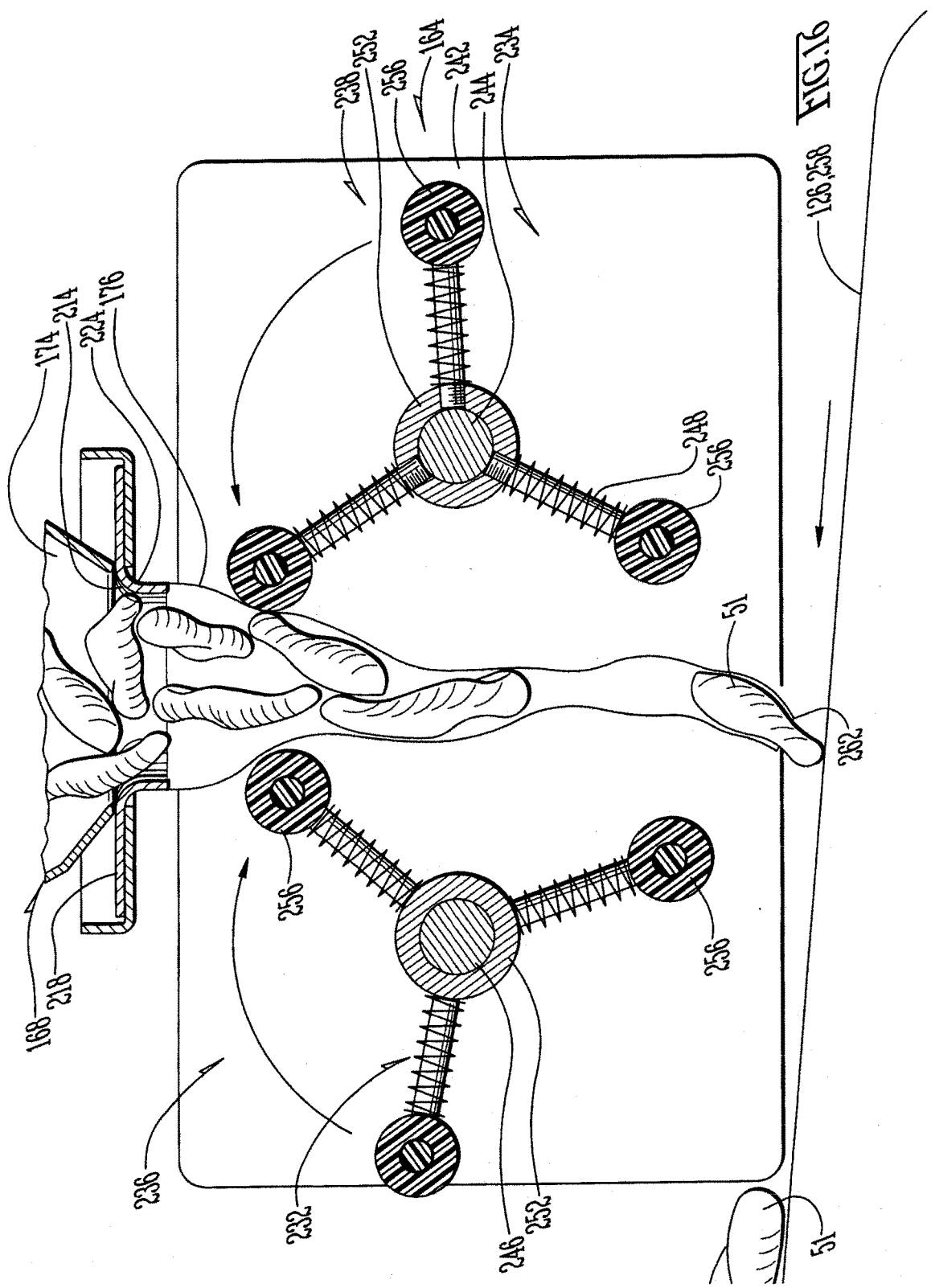
FIG. 16 is a sectional view comparable to FIG. 15 except showing the timing for the downline and upline massaging frame assemblies to have positively advanced by about still another 10° ahead of their position in FIG. 15.

FIG. 16 is a sectional view comparable to FIG. 15 except showing the timing for the downline and upline massaging frame assemblies 234 and 232 to have positively advanced by about still another 10° ahead of their position in FIG. 15. The lower tip end 56 of the elongate food product piece 50 is just beginning to poke out of the bottom port 262 of the soft-sided funnel 176, and be scraped by the underpassing food-product carrying upper run 258 of the upline outflow conveyor 126.

Figure 17:
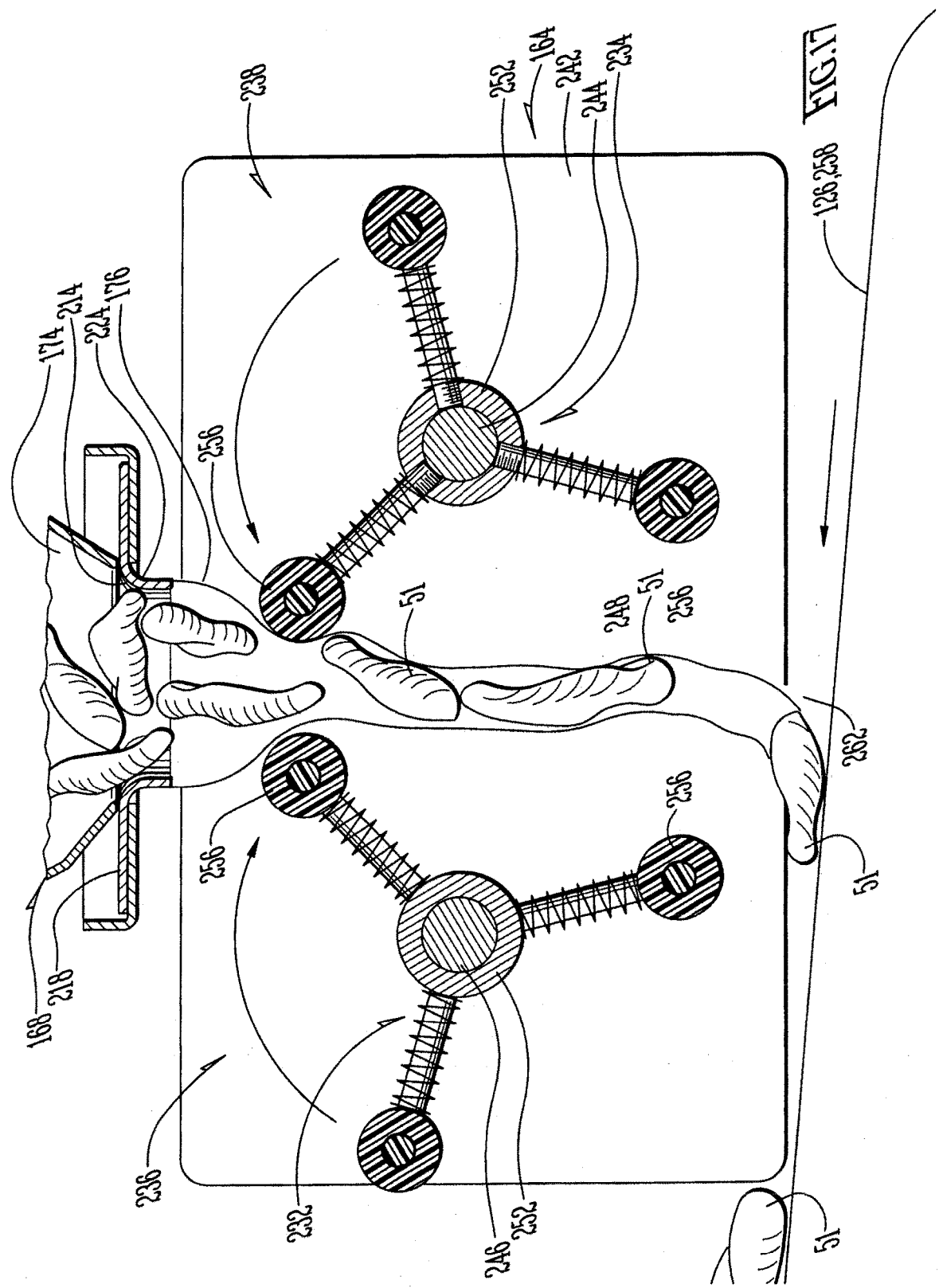
FIG. 17 is a sectional view comparable to FIG. 16 except showing the timing for the downline and upline massaging frame assemblies to have positively advanced by just a fractional amount more, of say about 3-5° ahead of their position in FIG. 16.

FIG. 17 is a sectional view comparable to FIG. 16 except showing the timing for the downline and upline massaging frame assemblies 234 and 232 to have positively advanced by just a fractional amount more, of say about 3-5° ahead of their position in FIG. 16.

Indeed, the underpassing food-product carrying upper run 258 of the upline outflow conveyor 126 assists in pulling the elongate food product piece 50 free of the bottom port 262 of the soft-sided funnel 176, and in the preferred longitudinal alignment, by frictional engagement.

Figure 18:
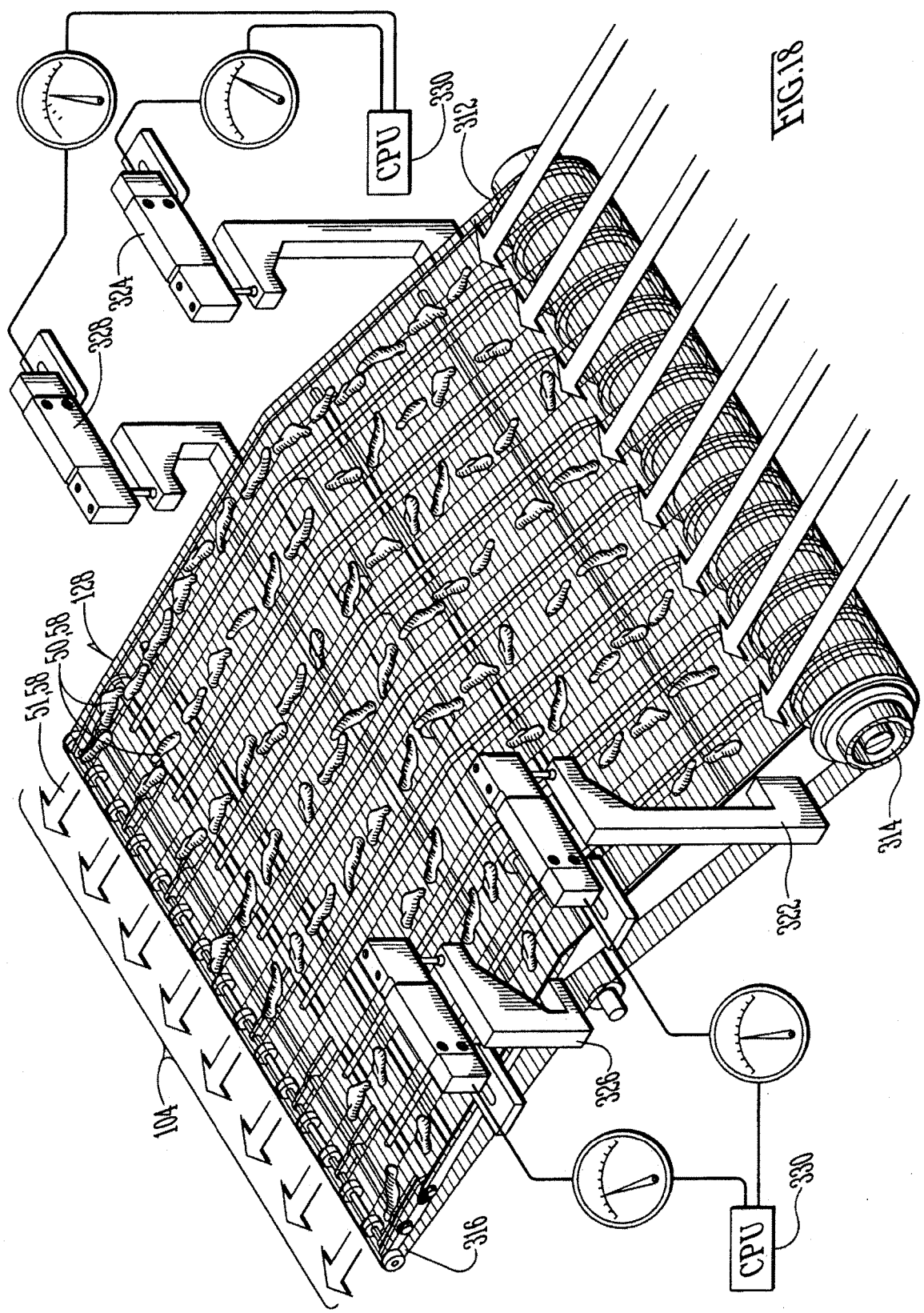
FIG. 18 is an enlarged-scale perspective view comparable to FIG. 6 except just showing the downline (and weighing) outflow conveyor in isolation, wherein food product is represented in part by elongate open arrows, and illustrated in other part as individual pieces.

FIG. 18 is an enlarged-scale perspective view comparable to FIG. 6 except just showing the downline (and weighing) outflow conveyor 128 in isolation, wherein food product is represented in part by elongate open arrows 51, and illustrated in other part as illustrated individual pieces 50.

The downline outflow conveyor 128 extends between an upline drive end 312 driven by a drum motor 314 and a downline nose end 316. The downline outflow conveyor 128 is essentially cantilevered from the drum motor 314. The downline nose end 316 is relatively free to pivot up and down relative the position shown in, for example, FIGS. 3, 3A, and 4.

It is preferable to use a drum motor 314 in contrast to a standard motor configuration. Standard motors have their skin mounted stationary and their central axle is a rotor which rotates. With drum motors 314, the central axle is held stationary and the skin (the cylindrical casing) rotates. It is preferred to use electric-powered drum motors 314. To return to FIG. 18, the freedom of the downline outflow conveyor 128 to rotate down to the ground is restrained by four load cells 322, 324, 326 and 328 (eg., electric-signal generating weight sensors). Relative to the upline drive end 312 of the downline outflow conveyor 128 (eg., the axis of drum motor 314), there are a near pair of left and right load cells 322 and 324 laterally opposite from each other, and a distant pair of left and right load cells 326 and 328 also laterally opposite from each other.

These load cells 322, 324, 326 and 328 suspend the cantilevered downline outflow conveyor 128 for reasons including in part just to hold it, unloaded and stopped (not running) in the position as shown in FIG. 3.

When the cantilevered downline outflow conveyor 128 is unloaded and stopped (not running), the load cells 322, 324, 326 and 328 will provide a signal corresponding to some force (eg., weight).

When the cantilevered downline outflow conveyor 128 is still unloaded but now running, the load cells 322, 324, 326 and 328 will provide a signal corresponding to a greater force. The differential between the two forces is the force required to oppose the centripetal force of the running drum motor 314.

All the foregoing signals are calibrated (or otherwise accounted for) to correspond to a tare weight. Now the load cells 322, 324, 326 and 328 are prepared for providing signals that can be corresponded to flow rate measurements.

FIG. 18 shows provides schematic (and fictional) gauge meters to show what forces (or weights) each one of the load cells 322, 324, 326 and 328 is individually reporting. On both the left and right sides of the downline outflow conveyor, the near pair of gauges are reporting greater forces than the distant pair of gauges. These gauges are shown this way for convenience sake and to explain how the reported information can be used.

Note however that all four gauges are reporting different values. The distant-left gauge is reporting the least value, the near-left gauge the second-least value, the distant-right gauge the third-least value, and the near right value the greatest value.

In use, it has been discovered that this set-up of load cells 322, 324, 326 and 328 can detect when a fresh row 58 of "N" lanes 104 of food product pieces 50 is deposited on the upline infeed end 312 of the downline outflow conveyor 128, and correspondingly when the lead row 58 of "N" lanes 104 traverses past (drops off) the downline nose end 316 of the downline outflow conveyor 128. Whereas it is assumed all "N" lanes 104 in all rows 58 are filled, that is not always true. Nevertheless, this set-up of load cells 322, 324, 326 and 328 is so sensitive that such missing occupancy can be detected and the transit of that hole in the array can be observed by a computational device 330. As an aside, the computational device 330 can provide indications of this to human observers according to programming.

Given the foregoing, an average weight (or mass) flow rate can be reckoned, and rate can be adjusted up or down accordingly as desired (within limits).

As an aside, the bulk hopper 122's floor infeed conveyor 124 travels much more slowly than the outflow conveyors a 126 and 128. This is because the weight (mass) of bulk food product 52,53 per unit length of infeed conveyor 124 is so much greater than the spaced distribution of pieces 50 on the outflow conveyors 126 and 128, that the outflow conveyors 126 and 128 have to travel at a relatively brisk speed to keep up.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A food-product loader for loading elongate pieces of meat onto an underpassing conveyor; comprising:
    a bulk hopper, adapted to receive a bulk supply of the elongate pieces of meat, having a trough portion extending from a high elevation characterized by a common headspace, transitioning into a lateral distribution of chutes in "N" lanes over the underpassing conveyor at an intermediate elevation, wherein each chute is formed a respective outlet port at a low elevation;
    a corresponding lateral distribution of soft-sided funnels respectively suspended below a respective outlet port of a respective chute and being elevationally elongated between an intake port, adapted to receive elongate pieces of meat from the respective outlet port of the respective chute, and, a dispensing port, adapted to dispense single pieces at a time of the elongate pieces of meat onto the underpassing conveyor;
    flanking massaging frame assemblies disposed to massage spaced upline and downline portions of sides of the soft-sided funnels for massaging or teasing out one piece of food product at a time;
    a source of solution; and
    a solution spray system comprising a sprayer spraying solution over the bulk supply of the elongate pieces of meat at or proximate the common headspace of the trough portion.

2. The food-product loader of claim 1, wherein:
    the sprayer comprises a laterally elongate spray arm suspended over the common headspace of the trough portion.

3. The food-product loader of claim 2, wherein:
    the sprayer comprises a laterally distributed plurality of spray sources suspended over the common headspace of the trough portion.

4. The food-product loader of claim 3, further comprising:
    a plurality of laterally-distributed rigid-walled lane dividers suspended across a food-product carrying run of the underpassing conveyor and partitioning the food-product carrying run laterally into "N" lanes;
    wherein the dispensing ports of the soft-sided tunnels and the plurality of lane dividers are cooperatively arranged such that the dispensing ports dispense into a respective one of the "N" lanes partitioned across the food-product carrying run of the underpassing conveyor.

5. The food-product loader of claim 4, wherein:
    the solution spray system further comprises another sprayer spraying solution over the dispensed elongate pieces of meat at or proximate overhead space over the lane dividers.

6. The food-product loader of claim 5, wherein:
    this other sprayer comprises a laterally distributed plurality of spray sources suspended over the lane dividers.

7. The food-product loader of claim 4, wherein:
    the solution spray system further comprises a recirculation pump for recirculating excess solution collected below the food-product carrying run of the underpassing conveyor back through the one and the other sprayers.

8. A food-product loader for loading elongate pieces of meat onto an underpassing conveyor; comprising:
    a bulk hopper, adapted to receive a bulk supply of the elongate pieces of meat, having a trough portion extending from a high elevation, transitioning into a lateral distribution of chutes in "N" lanes over the underpassing conveyor at an intermediate elevation, wherein each chute is formed as a respective outlet port at a low elevation;
    a corresponding lateral distribution of soft-sided funnels respectively suspended below a respective outlet port of a respective chute and being elevationally elongated between an intake port, adapted to receive elongate pieces of meat from the respective outlet port of the respective chute, and, a dispensing port, adapted to dispense single pieces at a time of the elongate pieces of meat onto the underpassing conveyor;
    flanking massaging frame assemblies disposed to massage spaced upline and downline portions of sides of the soft-sided funnels for massaging or teasing out one piece of food product at a time;
    a plurality of laterally-distributed rigid-walled lane dividers suspended across a food-product carrying run of the underpassing conveyor and partitioning the food-product carrying run laterally into "N" lanes;
    wherein the dispensing ports of the soft-sided tunnels and the plurality of lane dividers are cooperatively arranged such that the dispensing ports dispense into a respective one of the "N" lanes partitioned across the food-product carrying run of the underpassing conveyor;
    the food-product loader further comprising rigid-walled sidewalls suspended across the food-product carrying run of the underpassing conveyor as well as downline from the plurality of laterally-distributed rigid-walled lane dividers providing continuation of the food-product carrying run being laterally partitioned into "N" lanes for some downline extent past the dispensing ports of the downline soft-sided funnels;
    wherein the rigid-walled sidewalls can be characterized alternately as left-side leafs and right-side leafs adjustably connected to downline margins of the lane dividers to pivot about an elevationally elongated pivot axis; and
    a respective left-side leaf and right-side leaf for a given one of the "N" lanes are pivotally adjustable laterally toward and away from each other between tapering and relatively parallel extremes;
    whereby the respective left-side leaf and right-side leaf for the given one of the "N" lanes serve as a collimating channel that can be focused to make a relatively narrow choke point (bottleneck) for the pieces of elongate food product headed downline, and thereby provide a longitudinally-straightening effect on the elongate pieces of food product.

9. The food-product loader of claim 8, further comprising:
    a pair of laterally-elongated laterally-extending drive rods having reversibly thrusting drive strokes, one of the pair of the laterally-elongated laterally-extending drive rods being arranged and coupled to drive left-side leafs only and the other of the pair of the laterally-elongated laterally-extending drive rods being arranged and coupled to drive right-side leafs only;

whereby all the left-side leafs are adjusted in unison as are all the right-side leafs.

10. The food-product loader of claim 8, wherein:

the flanking massaging frame assemblies comprise an upline massaging frame assembly and a downline massaging frame assembly;

the upline massaging frame is rotated by an upline drive axle therefor;

the downline massaging frame is rotated by a downline drive axle therefor;

the plurality of laterally-distributed rigid-walled lane dividers at each partition on both sides of all the "N" lanes are formed either (1) with an upline through-aperture for extension of the upline drive axle therethrough, or (2) with a downline through-aperture for extension of the downline drive axle therethrough.

11. The food-product loader of claim 10, wherein:

the plurality of laterally-distributed rigid-walled lane dividers at each partition on both sides of all the "N" lanes are formed both (1) with an upline through-aperture for extension of the upline drive axle therethrough, and, (2) with a downline through-aperture for extension of the downline drive axle therethrough.

12. The food-product loader of claim 11, wherein:

each massaging frame is laterally partitioned into "N" sections across the "N" lanes;

each section comprises plural paddles connected extended from and driven in rotation by the respective drive axle therefor;

the plural paddles in each section are angularly-space apart from one another and present massaging surfaces radially spaced from the respective drive axle therefor.

13. The food-product loader of claim 12, wherein:

the paddles comprise cross bars elongated within and relative to the respective section therefor, which cross bars are supported radially spaced away from the respective drive axle therefor by at least two laterally-spaced spokes;

and further comprising a biasing arrangement for the cross bars relative the spokes biasing the cross bars in a radially outward extreme and while permitting radially-inward yielding;

whereby the biasing arrangement enhances peristaltic-style motivation of single pieces at a time out through the dispensing ports of the soft-side funnels so that one individual piece after the next dispensed by any given dispensing port are relatively longitudinally spaced apart from one another.

14. A food-product loader for loading elongate pieces of meat onto an underpassing conveyor; comprising:

a bulk hopper, adapted to receive a bulk supply of the elongate pieces of meat, having a trough portion extending from a high elevation, transitioning into a lateral distribution of chutes in "N" lanes over the underpassing conveyor at an intermediate elevation, wherein each chute is formed as a respective outlet port at a low elevation;

a corresponding lateral distribution of soft-sided funnels respectively suspended below a respective outlet port of a respective chute and being elevationally elongated between an intake port, adapted to receive elongate pieces of meat from the respective outlet port of the respective chute, and, a dispensing port, adapted to dispense single pieces at a time of the elongate pieces of meat onto the underpassing conveyor;

flanking massaging frame assemblies disposed to massage spaced upline and downline portions of sides of the soft-sided funnels for massaging or teasing out one piece of food product at a time;

the underpassing conveyor having a downline transfer end; and further comprising a downline outflow conveyor extending longitudinally between an upline infeed end receiving a flow of food product from the downline transfer end of the underpassing conveyor, and, a downline nose end for said food product loader; as well as weight sensors arranged with the downline outflow conveyor to provide weight signals corresponding to food-product output or through-put flow rate.

15. The food-product loader of claim 14, further comprising:

a drum motor mounted in or on the food product loader to have a relatively stationary drive axis relative the food product loader;

the downline outflow conveyor comprising an endless belt arranged to longitudinally course around the upline infeed end where the downline outflow conveyor is driven by the drum motor, and, the downline nose end, such that the downline outflow conveyor presents an upper food-product carrying run and a lower return run; and the weight sensors comprise at least a laterally-spaced pair of load cells supporting the downline outflow conveyor cantilevered from the drum motor.

16. The food-product loader of claim 15, wherein:

the weight sensors comprise a laterally-spaced near pair of load cells relative the drum motor, and a laterally-spaced distant pair of load cells relative the drum motor, all which load cells cooperatively support the downline outflow conveyor cantilevered from the drum motor.

17. The food-product loader of claim 16, further comprising:

a controller receiving the signals of the load cells as input.

18. The food-product loader of claim 17, wherein:

the controller is programmed to provide information corresponding to a wide variety of reported values of the four load cells, even when all four load cells are reporting different values, such as the case when a single piece of food product is missing in any given lane in any given row transiting across the downline outflow conveyor.

* * * * *